United States Patent
Coffrin et al.

(10) Patent No.: US 10,591,520 B2
(45) Date of Patent: Mar. 17, 2020

(54) ALTERNATING CURRENT (AC) POWER FLOW ANALYSIS IN AN ELECTRICAL POWER NETWORK

(71) Applicant: NATIONAL ICT AUSTRALIA LIMITED, Eveleigh, NSW (AU)

(72) Inventors: Carleton Coffrin, Eveleigh (AU); Hassan Hijazi, Eveleigh (AU); Pascal Van Hentenryck, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 1058 days.

(21) Appl. No.: 14/398,329

(22) PCT Filed: May 23, 2013

(86) PCT No.: PCT/AU2013/000545
§ 371 (c)(1),
(2) Date: Oct. 31, 2014

(87) PCT Pub. No.: WO2013/173879
PCT Pub. Date: Nov. 28, 2013

(65) Prior Publication Data
US 2015/0088439 A1    Mar. 26, 2015

(30) Foreign Application Priority Data

May 23, 2012    (AU) ................................ 2012902118

(51) Int. Cl.
*G01R 21/06*    (2006.01)
*H02J 3/00*    (2006.01)
(Continued)

(52) U.S. Cl.
CPC ................ *G01R 21/06* (2013.01); *H02J 3/00* (2013.01); *H02J 3/005* (2013.01); *G06Q 20/06* (2013.01);
(Continued)

(58) Field of Classification Search
CPC ............................ G06F 2217/78; G06Q 10/04
See application file for complete search history.

(56) References Cited

U.S. PATENT DOCUMENTS 6,625,520 B1 * 9/2003 Chen ........................ H02J 3/00
                                                    700/286
6,775,597 B1    8/2004 Ristanovic et al.
(Continued)

OTHER PUBLICATIONS

Ramos, Path-Based Distribution Network Modeling: Application to Reconfiguration for Loss Reduction, IEEE Transactions on Power Systems, vol. 20, No. 2, May 2005, pp. 556-564.*
(Continued)

*Primary Examiner* — Michael J Dalbo

(57) ABSTRACT

An alternating current (AC) power flow analysis in an electrical power network. Based on information relating to buses and transmission lines connecting the buses in the electrical power network, a convex approximation of AC power flows in the electrical power network is determined. The convex approximation of the AC power flows comprises convex approximation of nonlinear cosine terms associated with active power components and reactive power components of the AC power flows. A convex objective function associated with the electrical power network is optimised using the convex approximation of the AC power flows.

23 Claims, 9 Drawing Sheets

(51) Int. Cl.
   *G06Q 20/06*   (2012.01)
   *G06Q 50/06*   (2012.01)
(52) U.S. Cl.
   CPC .......... *G06Q 50/06* (2013.01); *H02J 2203/20* (2020.01); *Y02E 40/76* (2013.01); *Y02E 60/76* (2013.01); *Y04S 10/545* (2013.01); *Y04S 40/22* (2013.01)

(56) References Cited

U.S. PATENT DOCUMENTS

| | | | | |
|---|---|---|---|---|
| 7,184,992 | B1* | 2/2007 | Polyak | G05B 13/021 700/49 |
| 7,660,649 | B1* | 2/2010 | Hope | G06Q 10/04 700/28 |
| 2008/0077368 | A1* | 3/2008 | Nasle | G05B 17/02 703/4 |
| 2009/0027066 | A1 | 1/2009 | Li et al. | |
| 2012/0150504 | A1* | 6/2012 | Akrotirianakis | G06F 17/11 703/2 |
| 2014/0032187 | A1* | 1/2014 | Legbedji | G05B 13/042 703/2 |

OTHER PUBLICATIONS

Wu, Initialisation, decoupling, hot start, and warm start in direct nonlinear interior point algorithm for optimal power flows, IEE Proc.-Gener. Trunsm. Distrib . . . vol. 148, No. I , Jan. 2001, pp. 67-75.*

Rosen, J.B. & Marcia, R.F. Computational Optimization and Applications (2004) 28: 173 https://doi.org/10.1023/B:COAP.0000026883. 13660.84.*

Dommel, Optimal Power Flow Solutions, IEEE Transactions on Power Apparatus and Systems, vol. PAs-87, No. 10, Oct. 1968.*

Peterson, Norris M., William F. Tinney, and Donald W. Bree. "Iterative linear AC power flow solution for fast approximate outage studies." IEEE Transactions on Power Apparatus and Systems 5 (1972): 2048-2056.*

Delfanti, Maurizo, et al. "Optimal capacitor placement using deterministic and genetic algorithms." Power Industry Computer Applications, 1999. PICA'99. Proceedings of the 21st 1999 IEEE International Conference. IEEE, 1999.*

Duran, An Outer-Approximation Algorithm for a Class of Mixed-Integer Nonlinear Programs, Mathematical Programming 36 (1986) 307-339.*

Nicholson, Optimum Dispatch of Active and Reactive Generation by Quadratic Programming, Power System Engineering Committee of the IEEE Power Engineering Society for presentation at the IEEE, Summer Meeting, San Francisco, Calif., Jul. 9-14, 1972. Manuscript submitted Sep. 13, 1971; made available for printing May 11, 1972.*

Bai, Semidefinite programming for optimal power flow problems, Electrical Power and Energy Systems 30 (2008) 383-392.*

J. A. Taylor et al., "Linear Relaxations for Transmission System Planning", IEEE Transactions on Power System, vol. 26, No. 4, Nov. 2011, pp. 2533-2538.

B. Stott et al, "Linear Programming for Power-System Network Security Applications", IEEE Transactions on Power Apparatus and Systems, vol. PAS-08, No. 3, May/Jun. 1979, pp. 837-848.

A. Verma, "Power Grid Security Analysis: An Optimization Approach", Columbia University, 2009, pp. 1-150.

Australian Patent Office, International Search Report and the Written Opinion of the International Searching Authority, International Application No. PCT/AU2013/000545, Aug. 2013, 11 pages.

* cited by examiner (a)

(b)

(b)

$PWL<COS>(r_{\overline{cos}}, x, l, h, s)$
1  $inc \leftarrow (h - l)/(s + 1)$
2  $loc \leftarrow l + inc$
3  for $i \in 1..s$
4  do $f_{loc} \leftarrow \cos(loc)$
5      $s_{loc} \leftarrow -\sin(loc)$
6      $post(r_{\overline{cos}} \leq s_{loc}x - s_{loc}loc + f_{loc})$
7      $inc \leftarrow inc - loc$

ALTERNATING CURRENT (AC) POWER FLOW ANALYSIS IN AN ELECTRICAL POWER NETWORK

CROSS REFERENCE TO RELATED APPLICATION

The present application claims priority from Australian Provisional Application No. 2012902118, the content of which is incorporated by reference.

TECHNICAL FIELD

This disclosure generally concerns electrical power networks, and more particularly, a computer-implemented method for AC power flow analysis in an electrical power network. This disclosure also concerns a computer system, a computer program and an electrical power network employing the method.

BACKGROUND

Optimization technology is ubiquitous in modern power systems and resulted in cost savings. However, the increasing role of demand response, the integration of renewable sources of energy, and the desire for more automation in fault detection and recovery pose new challenges for the planning and control of electrical power systems. Power grids now need to operate in more stochastic environments and under varying operating conditions, while still ensuring system reliability and security.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

According to a first aspect, there is provided a computer-implemented method for alternating current (AC) power flow management in an electrical power network, the method comprising:

(a) based on information relating to buses and transmission lines connecting the buses in the electrical power network, determining a convex approximation of AC power flows in the electrical power network, wherein the convex approximation of the AC power flows comprises convex approximation of nonlinear cosine terms associated with active power components and reactive power components of the AC power flows;

(b) optimizing a convex objective function associated with the electrical power network using the convex approximation of the AC power flows; and (c) adapting the electrical power network according to the optimised convex objective function.

In one example, convex approximation in (a) may comprise linear programming approximation of the AC power flows, wherein linear approximation of cosine terms associated with the active power components and reactive power components are determined; and optimisation in (b) based on a set of nonlinear constraints that comprises the linear approximation of cosine terms. In this case:

A piecewise linear approximation of the cosine terms may be used, and the set of nonlinear constraints includes a set of linear inequalities obtained from the piecewise linear approximation.

The set of nonlinear constraints associated with the reactive power components may be determined by: expressing voltage magnitudes as variations from fixed magnitudes, and separating the nonlinear terms into the sum of a first part involving only the fixed magnitudes and linearized in (b) and of a second part involving the variations which, is linearized using Taylor expansion of the nonlinear terms using the variations.

In another example, convex approximation in (a) may comprise convex quadratic programming approximation of the AC power flows, wherein second-order series approximation of cosine terms associated with the active power components and reactive power components are determined; and optimisation in (b) is based on a set of nonlinear constraints that includes the second-order series approximation of cosine terms. In this case:

The series approximation may be second-order Taylor series approximation of the cosine terms.

The active power components and reactive power components may be defined using convex approximation of power loss terms relating to power loss on the transmission lines connecting the buses in the electrical power network.

The active power components and reactive power components may further include a linear outer-approximation of voltage square terms in the components.

The set of nonlinear constraints may further comprise variables to relax the square of the voltage magnitude and phase angel difference terms associated with the active power components and reactive power components, and to define a convex feasible region.

The optimisation in (b) may be for any suitable application. Some examples are provided below:

In an AC power flow application, (i) the objective function in (b) may be associated with the convex approximation of the cosine terms associated with the active power components and reactive power components; and (ii) optimising the objective function maximizes the convex approximation of the cosine terms.

In a power restoration application, (i) the objective function may be associated with a served load of the electrical power network; and (ii) optimising the objective function maximises the served road to further determine one or more of: generation of active power at each bus, generation of reactive power at each bus and a maximised served load. In this case, optimisation of the objective function in (ii) may be based on nonlinear constraints associated with active power generation, and desired active load and desired reactive load at each bus.

In a capacitor placement application, (i) the objective function may be associated with a number of capacitors for placement in the electrical power network; and (ii) optimising the objective function optimises the number of capacitors placed in the electrical power network. In this case, optimisation of the objective function in (ii) may be based on nonlinear constraints associated with one or more of: desired voltage limit, capacitor injection variables, and reactive generation limits of generators.

In an AC optimal power flow application, (i) the objective function may be associated with a cost of generating electricity in the electrical power network; and (ii) optimising the objective function minimises the cost of generating electricity in the electrical power network.

Further, convex approximation of the AC power flows may further comprise convex approximation of sine terms associated with active power components and reactive power components of the AC power flows.

The optimisation in (b) may be based on nonlinear constraints relating to the reactive power components, the nonlinear constraints being determined by: setting conductance (g) values set to zero; or setting cosine terms set to unity, and using non-zero conductance (g) values.

The optimisation in (b) may be based on constraints relating to one or more of:
- Kirchoff's power laws on the buses,
- slack bus in the electrical power network;
- properties of generator buses and loads in the electrical power network;
- properties of transformers, line charging, capacitors, and condensors;
- lower and upper bounds on voltage magnitudes and phase angles;
- lower and upper bounds on active and reactive power; and
- upper bounds on line apparent power.

The optimisation in (b) may be based on one of the following:
- hot start model, wherein the information in (a) includes a known voltage magnitude at each bus;
- warm start model, wherein the information in (a) includes a desired target voltage magnitude at each bus; and
- cold start model, wherein the information in (a) includes known voltage magnitude at each voltage-controlled generator bus only The convex approximation may be used in an optimisation algorithm for one or more of: transmission planning, unit commitment, economic dispatch, demand response, transmission switching, vulnerability analysis, and placement of renewable resources or electrical power components in the electrical power network.

According to a second aspect, there is provided a computer program comprising computer-executable instructions to cause a computer to perform the method for alternating current (AC) power flow analysis in an electrical power network according to the first aspect. The computer-executable instructions may be stored in a computer-readable medium.

According to a third aspect, there is provided a computer system for alternating current (AC) power flow analysis in an electrical power network, the system comprising a processing device to perform the method according to the first aspect.

According to a fourth aspect, there is provided an electrical power network in which analysis of AC power flow is performed using the method-according to the first aspect. For example, results of the AC power flows analysis may be used to design and/or operate the electrical power network.

BRIEF DESCRIPTION OF DRAWINGS

Examples will now be described with reference to the accompanying drawings, in which:

FIG. 5($b$) is an example algorithm for generating a piecewise linear approximation of cosine term(s) defining AC power flows;

FIG. 8($b$) is a plot of second-order Taylor approximation of sine terms defining AC power flows;

FIG. 8($c$) is a plot of linear approximation of voltage square terms defining AC power flows.

NOMENCLATURE

Real numbers are denoted by lowercase letters and complex numbers by uppercase letters with a tilde above. A complex number $\tilde{V}$ is represented as $v+i\theta$ in rectangular form and $|\tilde{V}|\angle\theta$ in polar form. The following letters are used for common quantities in power systems: Voltage $\tilde{V}=v+i\theta$, current $\tilde{I}$, power $\tilde{S}=p+iq$, admittance $\tilde{Y}=g+ib$, and impedance $\tilde{Z}=r+ix$. Values with one subscript (e.g. $\tilde{S}_n$) pertain to buses, while values with two subscripts (e.g. $\tilde{S}_{nm}$) pertain to lines.

The following symbols are used throughout the disclosure.

| | |
|---|---|
| $\tilde{I}$ | Alternating current (AC) |
| $\tilde{V} = v+i\theta$ | AC voltage |
| $\tilde{S} = p + iq$ | AC power |
| $\tilde{Z} = r + ix$ | Line impedance |
| $\tilde{Y} = g + ib$ | Line admittance |
| $\tilde{Y}^b = g^b + ib^b$ | Y-Bus element |
| $\tilde{Y}^c = g^c + ib^c$ | Line charge |
| $\tilde{Y}^s = g^s + ib^s$ | Bus shunt |
| $\tilde{T} = t + is$ | Transformer tap ratio |
| $\tilde{V} = |\tilde{V}|\angle\theta°$ | Polar form of AC voltage |
| $\tilde{S}_n$ | AC Power at bus n |
| $\tilde{S}_{nm}$ | AC Power on a line from n to m |
| PN | Power network |
| N | Set of buses in a power network |
| L | Set of lines in a power network |
| G | Set of voltage controlled buses |
| s | Slack bus |
| $|\tilde{V}^h|$ | Hot-Start voltage magnitude |
| $|\tilde{V}^t|$ | Target voltage magnitude |
| $\phi$ | Voltage magnitude change |
| $\Delta$ | Absolute difference |
| $\delta$ | Percent difference |
| $\hat{x}$ | Approximation of x |
| $\overline{x}$ | Upper bound of x |
| $\underline{x}$ | Lower bound of x |

DETAILED DESCRIPTION

Figure 1:
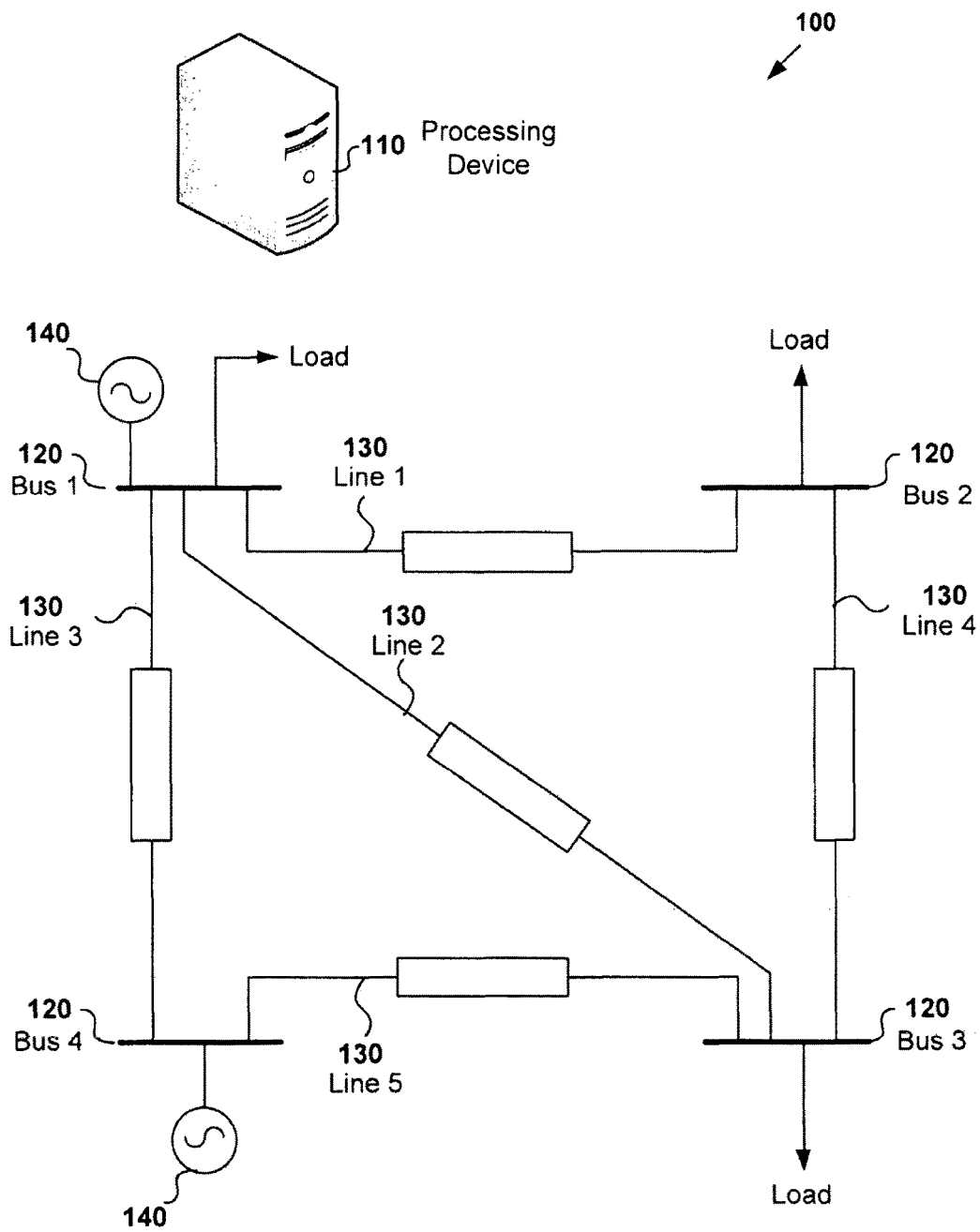
FIG. 1 is a schematic diagram of an example system for AC power flow analysis.

FIG. 1 shows an example system 100 that includes a processing device 110 capable of performing AC flow analysis for an electrical power network. In general, a power network is composed of several types of components such as buses, lines, generators and loads. The power network may be interpreted as a graph $\langle N, E \rangle$ where the set of buses N represent the nodes and the set of lines E represent the edges. For AC power flow studies:

A subset of generators may be represented as $G \subseteq N$ and the slack bus $s \in G$.

Every bus $n \in N$ in the network has two properties, a voltage $\tilde{N}_n = v_n + i\theta_n$ and a power $\tilde{S}_n = p_n + iq_n$, both of which are represented as complex numbers due to the ossilating nature of current and voltage.

$|\tilde{V}_n|$ may be used to denote the voltage magnitude $\sqrt{v_n^2 + \theta_n^2}$ in the present disclosure.

Each line $\langle n, m \rangle \in E$ has an admittance $\tilde{Y}_{nm} = g_{nm} + ib_{nm}$, also a complex number.

The above network values are generally connected by two fundamental physical laws, Kirchhoff's Current Law (KCL) and Ohm's Law. In the example in FIG. 1, the electrical power network PN comprises four buses 120 (buses 1 to 4) and five transmission lines 130 (lines 1 to 5) connecting the buses 120. Bus 1 and Bus 4 are each connected to a generator 130. Three types of buses are shown, in which:

Bus 1 is known as a slack bus, which is an arbitrary bus in the network that has a generator and with known voltage magnitude and voltage phase.

Buses 2 and 3 are each known as a load bus, which is a bus that is not connected to a generator and with unknown voltage magnitude and voltage angle.

Bus 4 is a "generator" or voltage-controlled bus, which is a bus that has a generator and with known voltage magnitude.

Line 1 connects bus 1 to bus 2; line 2 connects bus 1 to bus 3; line 3 connects bus 1 to bus 4; line 4 connects bus 2 to bus 3; and line 5 connects bus 3 to bus 4. Although a four-bus, five-line power network is shown, it will be appreciated that this example can be extended to any arbitrary network defined by:

$$PN = \langle N, L, G, s \rangle,$$

where N is the set of buses, L is the set of lines (used interchangeably with E throughout the disclosure), G is the set of voltage-controlled generators, and s is the slack bus.

Example AC Power Flow Analysis Method

Figure 2:
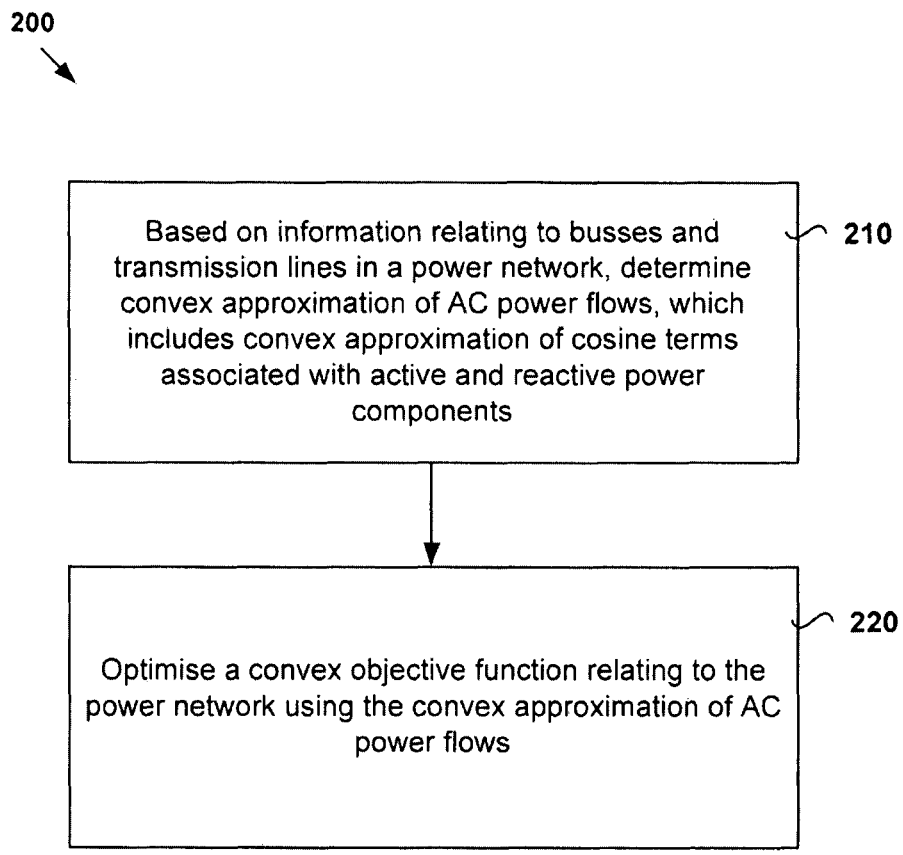
FIG. 2 is a flowchart of an example method for AC power flow analysis.

An example method for AC power flow analysis in the electrical power network is shown in FIG. 2. In general, the example method 200 includes the following steps performed by the processing device 110:

At block 210, the processing device 110 determines a convex approximation of AC power flows based on information relating to busses and transmission lines in an electrical power network. The convex approximation of AC power flows includes convex approximation of nonlinear cosine terms associated with active power components and reactive power components of the AC power flows.

At block 220, the processing device 110 optimises a convex objective function associated with the electrical power network using the convex approximation of the AC power flows.

Equations defining the AC power flows are generally a system of non-convex, nonlinear equalities which are NP-hard (i.e. Non-deterministic, Polynomial time hard) to solve and extremely challenging computationally in general. Such non-convex models that are not guaranteed to converge (especially outside of operating conditions).

According to the example method in FIG. 2, convex approximation of AC power flows is determined and used in the subsequent optimisation. As such, optimisation based on the convex approximation may be performed more accurately and efficiently, such as in low polynomial time. Further, since a convex model is used, discrete optimization technology may be used to solve decision support problems in power systems more efficiently. This leads to more accurate approximation of AC power flows, as well as more efficient and cost-effective electrical power networks.

Figure 3:
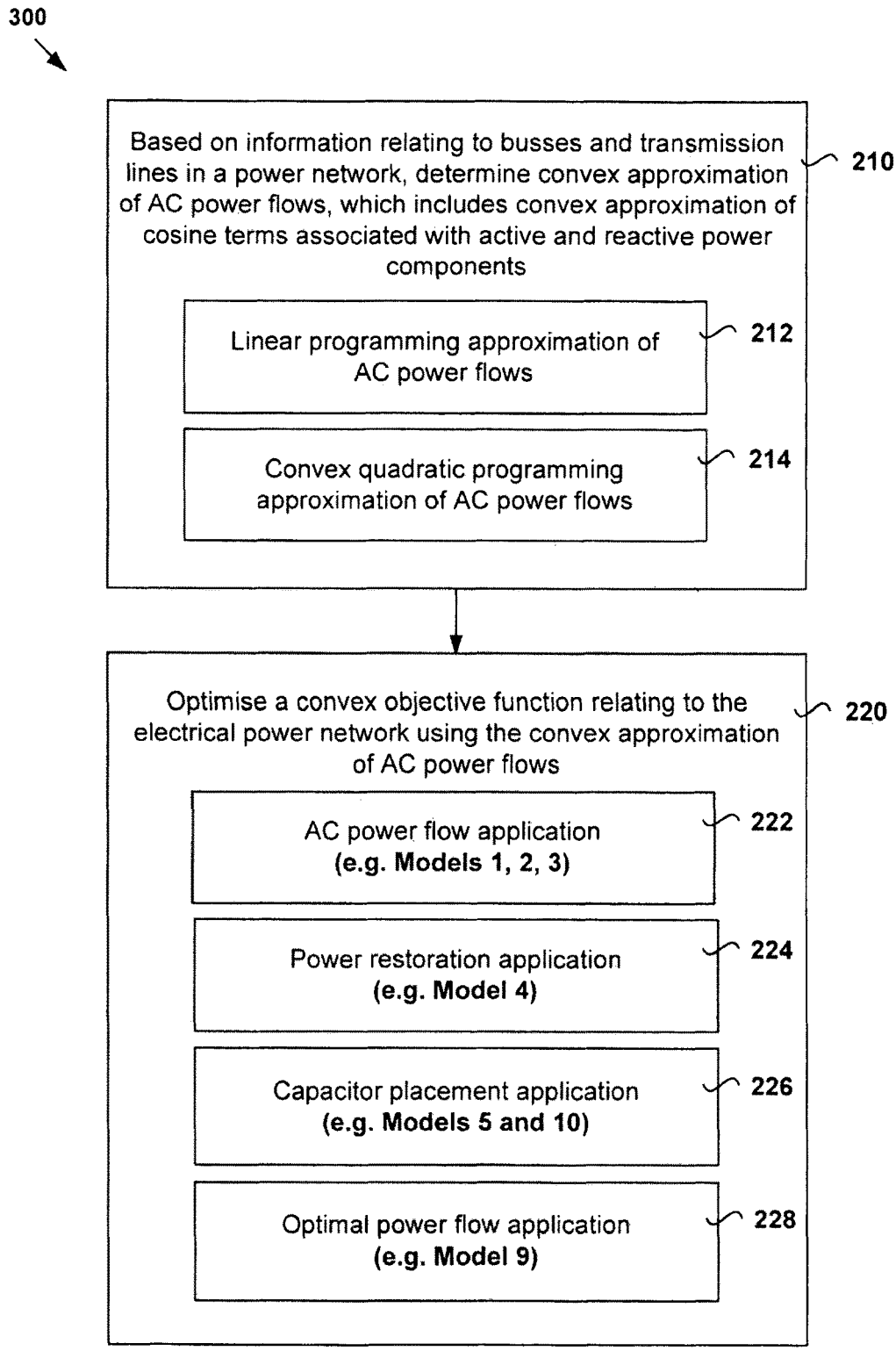
FIG. 3 is a detailed flowchart of the example method in FIG. 2.
Figure 4:
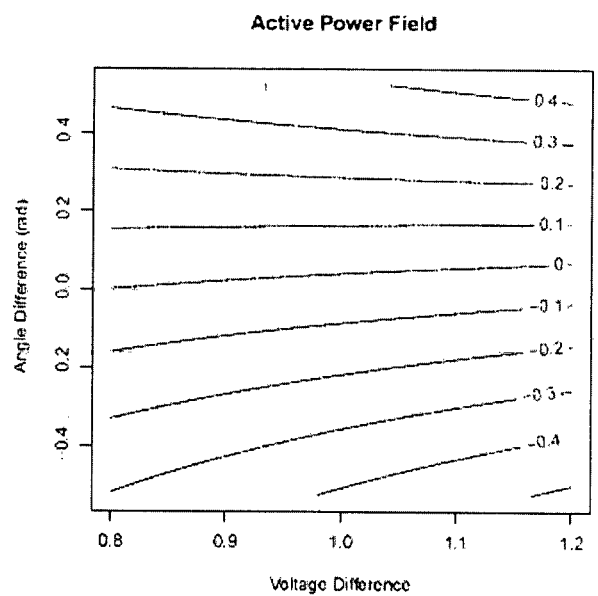
FIG. 4($a$) and FIG. 4($b$) are plots of the contour of (a) active power and (b) reactive power equations, respectively.
Figure 4:
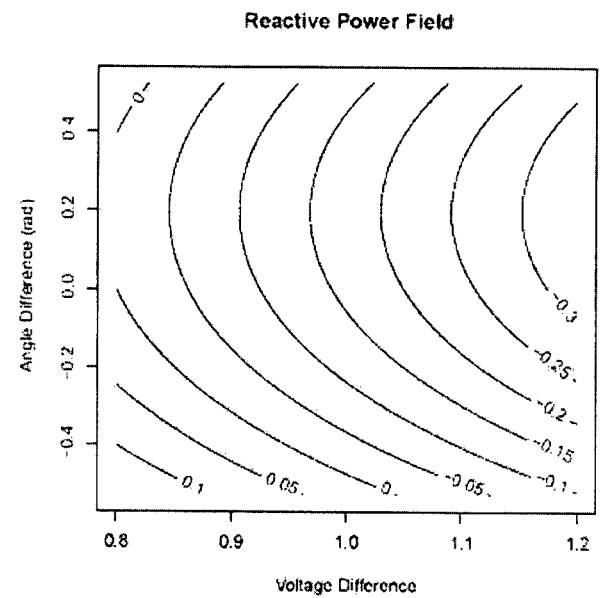
Figure 5:
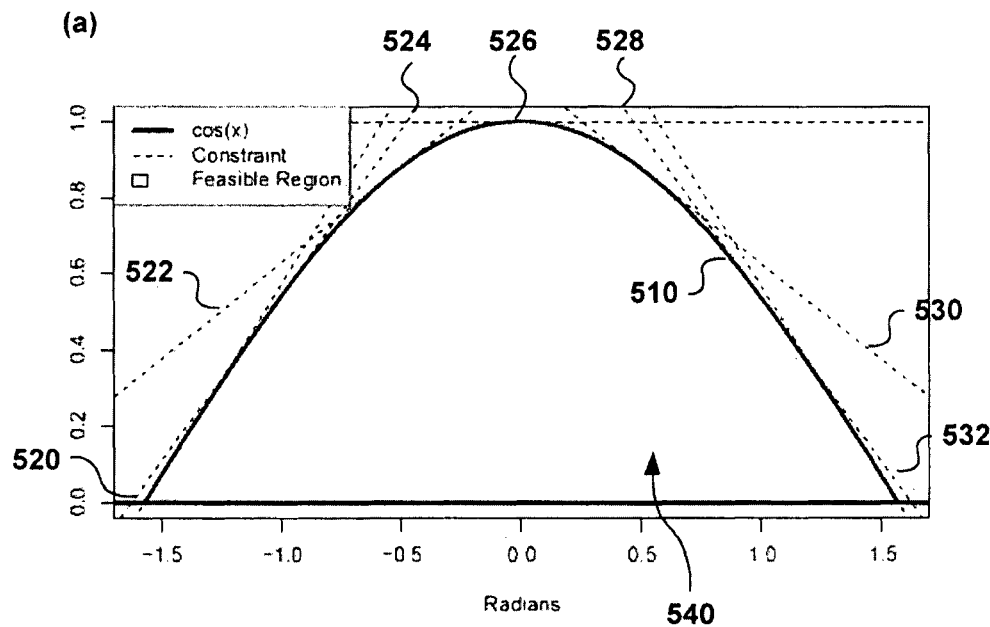
FIG. 5($a$) is a graph of a piecewise linear approximation of cosine term(s) defining AC power flows.
Figure 6:
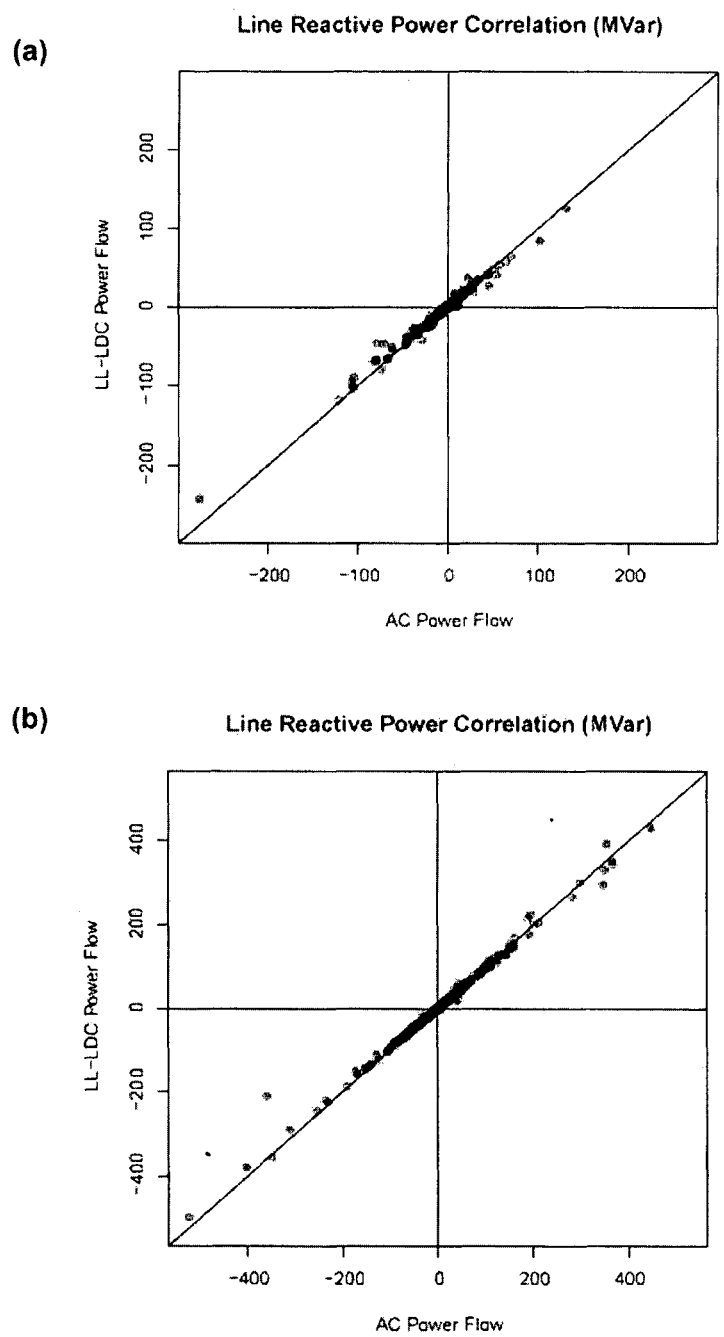
FIG. 6($a$) and FIG. 6($b$) are plots of reactive power flow correlation for the LPAC Model on (a) IEEEdd17m and (b) MP300 respectively.
Figure 7:
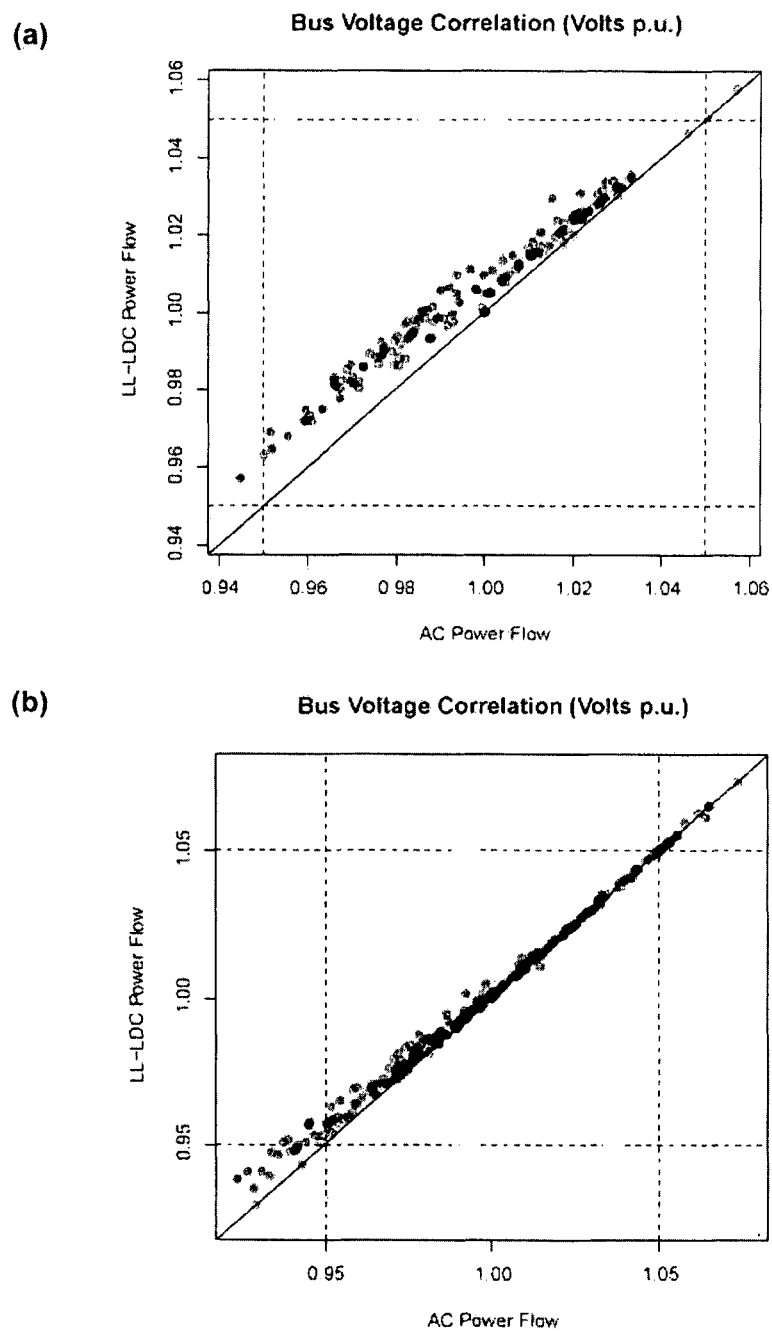
FIG. 7($a$) and FIG. 7($b$) are plots of voltage magnitude correlation for the LPAC Model on (a) IEEEdd17m and (b) MP300 respectively.

As shown in more detail in the flowchart 300 in FIG. 3, the convex approximation at block 210 may be one of the following.

Linear programming approximation of AC power flows (see block 212 in FIG. 3). This model ("LPAC model") includes linear approximation of cosine terms associated with the active power components and reactive power components. In one example, an outer approximation of the cosine terms is used.

Convex quadratic programming approximation of AC power flows (see block 214 in FIG. 3). This model ("QPAC model") includes a second-order series approximation of cosine terms associated with the active power components and reactive power components. In one example, second-order Taylor approximation is used to approximate the cosine terms, but it should be understood that other approximation techniques may be used, such as the convex outer approximation of LPAC model.

The convex approximation of AC power flows at block 210 may further include convex approximation of sine terms, such as using outer approximation or second-order Taylor approximation.

According to at least one example in the present disclosure, the LPAC and QPAC models may have one or more of the following properties:

1. reasonable accuracy both inside and outside normal operating conditions;
2. reasonable computational efficiency and scalability;
3. the ability to reason about voltage magnitudes and reactive power which become critical outside normal operating conditions;
4. the ability to be integrated in general purpose discrete optimization solvers, in particular Mixed-Integer Programming (MIP) or Mixed-Integer Nonlinear Programming (MINLP) solvers (e.g. CPLEX, Gurobi, and Bonmin) and their hybridizations with Constraint Programming (CP) and Large Neighbourhood Search (LNS).

Optimisation at block 220 may then be performed based on a set of nonlinear constraints that includes convex approximation of cosine terms associated with the active power components and reactive power components. Suitable applications of the optimisation include but not limited to: optimal power flow, node pricing market calculations, transmission switching, distribution network configuration, capacitor placement, expansion planning, vulnerability analysis, and power system restoration.

Referring to FIG. 3 again, some example objective functions discussed in the present disclosure are as follows (it should be understood that either the LPAC or QPAC model may be used in the optimisation):

In an AC power flow application (see block 222 in FIG. 3), the optimisation is to optimise the convex approximation of the AC power flows, or more specifically convex approximation of the cosine terms associated with the active and reactive power components. Examples are presented in Models 1, 2 and 3 below, in which linear programming approximation of AC power flows is used. It should be understood that the examples may also be adapted to the case of convex quadratic approximation.

In a power restoration application (see block 224 in FIG. 3), the optimisation is to maximise load(s) in the electrical power network. An example is presented in Model 4 below, in which linear programming approximation of AC power flows is used. It should be understood that the example may also be adapted to the case of convex quadratic programming approximation.

In a capacitor placement application (see block 226 in FIG. 3), the optimisation is to minimise the number of capacitors place in the electrical power network. Examples are presented in Model 5 (linear programming) and Model 10 (convex quadratic programming) below.

In an AC optimal power flow (OPF) application (see block 228 in FIG. 3), the optimisation is to minimise generator cost, i.e. to find the cheapest way to generate power in order to satisfy customers' demand given some cost functions of generators. An example is presented in Model 9 below, in which convex quadratic programming approximation is used. It should be understood that the example may also be adapted to the case of linear programming approximation.

The optimisation may be based on hot, warm or cold start models, as follows. It should be understood that either the LPAC or QPAC model may be used in the following.

In the hot start model, the optimisation is based on known voltage magnitudes. An example is shown in Model 1 using linear programming approximation, but this may be similarly used in the context of convex quadratic programming approximation.

In the warm start model, the optimisation is based on desired target voltage magnitudes. An example is shown in Model 2 using linear programming approximation, but this may be similarly used in the context of convex quadratic programming approximation.

In the cold start model, no reasonable voltage magnitudes are known and the optimisation is based on voltage controlled generator values. An example is shown in Model 3 using linear programming approximation, but this may be similarly used in the context of convex quadratic programming approximation.

Examples will now be described with reference to FIGS. 4 to 9. Section 1 provides an introduction to AC power flow equations, Section 2 provides example implementations of the LPAC model and Section 3 provides example implementations of the QPAC model.

Section 1—AC Power Flows

In steady state, AC power for bus n is given by $$\tilde{S}_n = \sum_m^{n \neq m} \tilde{V}_n \tilde{V}_n^* \tilde{Y}_{nm}^* - \tilde{V}_n \tilde{V}_m^* \tilde{Y}_{nm}^*. \quad (1)$$

This equation is not symmetric. From the perspective of bus n, the power flow on a line to bus n is $$\tilde{V}_n \tilde{V}_n^* \tilde{Y}_{nm}^* - \tilde{V}_n \tilde{V}_m^* \tilde{Y}_{nm}^*$$

while, from the perspective of bus m, it is $$\tilde{V}_m \tilde{V}_m^* \tilde{Y}_{mn}^* - \tilde{V}_m \tilde{V}_n^* \tilde{Y}_{mn}^*.$$

In general, the AC power flow from bus n to bus m is not the same as the AC power flow from bus m to bus n, i.e. $\tilde{S}_{nm} \neq \tilde{S}_{mn}$.

To model AC power flows, generators in the power system benchmarks are voltage-controlled. This means that every generator $n \in G$ has a predetermined voltage magnitude $|\tilde{V}_n^g|$, which fixes the voltage magnitude decision variable $|\tilde{V}_n|$, i.e., $|\tilde{V}_n^g| = |\tilde{V}_n| = \sqrt{v_n^2 + \theta_n^2}$.

(a) Traditional Representation

The AC power flow definition is generally expanded in terms of real numbers only. Complex numbers may be represented in rectangular or polar coordinates, i.e., $\tilde{V} = v + i\theta = |\tilde{V}| \angle \theta°$. Because power networks generally operate near a nominal voltage (i.e., $\tilde{V}_n \approx 1.0 \angle 0$), the voltages may be represented in polar coordinates and the remaining terms (power and admittance) in rectangular coordinates.

By representing power in rectangular form, the real ($p_n$) and imaginary ($q_n$) terms become:

$$p_{nm} = \sum_m^{n \neq m} |\tilde{V}_n|^2 g_{nm} - |\tilde{V}_n||\tilde{V}_m|(g_{nm}\cos(\theta_n^o - \theta_m^o) + b_{nm}\sin(\theta_n^o - \theta_m^o))$$

$$q_{nm} = \sum_m^{n \neq m} -|\tilde{V}_n|^2 b_{nm} - |\tilde{V}_n||\tilde{V}_m|(g_{nm}\sin(\theta_n^o - \theta_m^o) - b_{nm}\cos(\theta_n^o - \theta_m^o))$$

The Y-Bus Matrix:

The formulation can be simplified further by using a Y-Bus Matrix, i.e., a precomputed lookup table that allows the power flow at each bus to be written as a summation of n terms instead a summation of 2(n−1) terms. Observe that, in the power flow equations (1), the first term $\tilde{V}_n \tilde{V}_n^* \tilde{Y}_{nm}^*$ is a special case of the second term $-\tilde{V}_n \tilde{V}_m^* \tilde{Y}_{nm}^*$ with $-\tilde{V}_m = \tilde{V}_n$.

In general, we can eliminate this special case by:
1. extending the summation to include n terms, i.e., $\Sigma_m^{m \neq n}$ becomes $\Sigma_m$;
2. defining the Y-Bus admittance $$\tilde{Y}_{nm}^b = g_{nm}^y + ib_{nm}^y \text{ as}$$

$$\tilde{Y}_{nm}^b = \sum_m^{n \neq m} \tilde{Y}_{nm}$$

$$\tilde{Y}_{nm}^b = -\tilde{Y}_{nm}$$

Given the Y-Bus, the power flow equations (1) can be rewritten as a single summation $$\tilde{S}_n = \sum_m \tilde{V}_n \tilde{V}_m^* \tilde{Y}_{nm}^b \quad (2)$$

giving us the popular formulation of active and reactive power components:

$$p_n = \sum_m |\tilde{V}_n||\tilde{V}_m|(g_{nm}^y \cos(\theta_n^o - \theta_m^o) + b_{nm}^y \sin(\theta_n^o - \theta_m^o)) \quad (3)$$

-continued $$q_n = \sum_m |\tilde{V}_n||\tilde{V}_m|(g_{nm}^y \sin(\theta_n^o - \theta_m^o) - b_{nm}^y \cos(\theta_n^o - \theta_m^o)) \quad (4)$$

(b) An Alternate Representation

The Y-Bus formulation is concise but makes it difficult to reason about the power flow equations. This paper uses the more explicit equations which can be presented as bus and line equations as follows:

$$p_n = \sum_m^{n \neq m} p_{nm} \quad (5)$$

$$q_n = \sum_m^{n \neq m} q_{nm} \quad (6)$$

$$p_{nm} = |\tilde{V}_n|^2 g_{nm} - |\tilde{V}_n||\tilde{V}_m| g_{nm} \cos(\theta_n^o - \theta_m^o) - |\tilde{V}_n||\tilde{V}_m| b_{nm} \sin(\theta_n^o - \theta_m^o) \quad (7)$$

$$q_{nm} = -|\tilde{V}_n|^2 b_{nm} + |\tilde{V}_n||\tilde{V}_m| b_{nm} \cos(\theta_n^o - \theta_m^o) - |\tilde{V}_n||\tilde{V}_m| g_{nm} \sin(\theta_n^o - \theta_m^o) \quad (8)$$

Once again, Equations (7) and (8) are asymmetric and $p_{nm}$ and $q_{nm}$ are defined for each $\langle n, m \rangle \in E$. Also, g and b represent the line admittance values $\tilde{Y}=g+ib$. As will be demonstrated using examples below, the polar representation of voltage is useful for building approximations around the nominal operating point.

(c) Extensions for Practical Power Networks

In the above derivation, each line is a conductor with an impedance $\tilde{Z}$. The formulation can be extended to line charging and other components such as transformers and bus shunts, which are present in nearly, all AC system benchmarks. Example model for these extensions in the Y-Bus formulation are shown below for simplicity.

(i) Line Charging

A line connecting buses n and m may have a predefined line charge $\tilde{Y}^c=g^c+ib^c$. Linearizations of AC model typically assume that a line charge is evenly distributed across the line and hence it is reasonable to assign equal portions of its charge to both sides of the line. This is incorporated in the Y-Bus matrix as follows:

$$\tilde{Y}_{nn}^{b'}=\tilde{Y}_{nn}^b+\tilde{Y}_{nm}^c/2,$$

$$\tilde{Y}_{mm}^{b'}=\tilde{Y}_{mm}^b+\tilde{Y}_{nm}^c/2,$$

(ii) Transformers

A transformer connecting bus n to bus m can be modeled as a line with modifications to the Y-Bus matrix. The properties of the transformer are captured by a complex number $\tilde{T}_{nm}=|\tilde{T}|\angle s^o$, where $|\tilde{T}|$ is the tap ratio from n to m and $s^o$ is the phase shift. It is worth noting that the direction of a transformer-line is very important to model the tap ratio and phase shift properly. A transformer is modeled in the Y-Bus matrix as follows:

$$\tilde{Y}_{nn}^{b'}=\tilde{Y}_{nn}^b-\tilde{Y}_{nm}+\tilde{Y}_{nm}/|\tilde{T}_{nm}|^2,$$

$$\tilde{Y}_{nm}^{b'}=\tilde{Y}_{nm}/\tilde{T}_{nm}^*,$$

$$\tilde{Y}_{mn}^{b'}=\tilde{Y}_{mn}/\tilde{T}_{nm}.$$

If a line charge exists, it must be applied before the transformer calculation, i.e., $$\tilde{Y}_{nn}^{b'}=\tilde{Y}_{nn}^b-\tilde{Y}_{nm}+(\tilde{Y}_{nm}+\tilde{Y}_{nm}^c/2)/|\tilde{T}_{nm}|^2$$

(iii) Bus Shunts

A bus n may have a shunt element which is modeled as a fixed admittance to ground with a value of $\tilde{Y}^s=g^s+ib^s$. In the Y-Bus matrix, we have $$\tilde{Y}_{nn}^{b'}=\tilde{Y}_{nn}^b+\tilde{Y}_n^s$$

Unlike line charging, this extension is not affected by transformers, since it applies to a bus and not a line.

(d) Linearized DC Power Flow

The DC power flow model is a common response to the computational challenges of the AC power flow equations. Many variants of the Linearized DC (LDC) model exist. For brevity, we only review the simplest and most popular variant of the LDC, which is derived from the AC equations through a series of approximations justified by operational considerations under normal operating conditions. In particular, the LDC assumes that (1) the susceptance is large relative to the impedance $|g| \ll |b|$; (2) the phase angle difference $\theta_n^o - \theta_m^o$ is small enough to ensure $\sin(\theta_n^o - \theta_m^o) \approx \theta_n^o - \theta_m^o$ and $\cos(\theta_n^o - \theta_m^o) \approx 1.0$; and (3) the voltage magnitudes $|\tilde{V}|$ are close to 1.0 and do not vary significantly. Under these assumptions, Equations (7) and (8) reduce to $$p_{nm} = -b_{nm}(\theta_n^o - \theta_m^o) \quad (9)$$

From a computational standpoint, the DC power flow model may be much more appealing than the AC model: It forms a system of linear equations that admit reliable algorithms. These linear equations can also be embedded into MIP solvers. Under normal operating conditions and with some adjustment for line losses, the DC model produces a reasonably accurate approximation of the AC power flow equations for active power. Unfortunately, recent results have demonstrated that the inaccuracies of the DC power flow can be significant.

Section 2—LPAC Model

This section presents linear-programming approximations of the AC power flow equations. To understand the approximations, it is important to distinguish between hot-start and cold-start contexts. In hot-start contexts, a solved AC base-point solution is available and hence the model has at its disposal additional information such as voltage magnitudes. In cold start contexts, no such solved AC base-point solution is available and it can be "maddeningly difficult" to obtain one by simulation of the network.

Hot-start models are well-suited for applications in which the network topology is relatively stable, e.g., in LMP-base market calculations, optimal line switching, distribution configuration, and real-time security constrained economic dispatch. Cold-start models are used when no operational network is available, e.g., in long-term planning studies. We also introduce the concept of warm-start contexts, in which the model has at its disposal target voltages (e.g., from normal operating conditions) but an actual solution may not exist for these targets. Warm-start models are particularly useful for power restoration applications in which the goal is to return to normal operating conditions as quickly as possible.

This section presents hot-start, warm-start, and cold-start model in stepwise refinements. It also discusses how models can be generalized to include generation and load shedding, remove the slack bus, impose constraints on voltages and reactive power, and capacity constraints on the lines, all which are fundamental for many applications.

In one or more embodiments, the LPAC models have the potential to broaden the success of the traditional LDC model into new application areas and to bring increased accuracy and reliability to current LDC applications. There are many opportunities for further study, including the application of the LPAC models to a number of application areas. From an analysis standpoint, it would be interesting to compare the LPAC models with an AC solver using a "distributed slack bus". Such an AC solver models the real power systems more accurately and provides a better basis for comparison, since the LPAC models are easily extended to flexible load and generation at all buses.

One example of the LPAC model has been experimentally evaluated over a number of standard benchmarks under normal operating conditions and under contingencies of various sizes. Experimental results shows strong correlations between the method and solutions to the AC power equations for active and reactive power, phase angles, and voltage magnitudes. Moreover, the method may be integrated in mixed integer programming (MIP) models for applications reasoning about reactive power (e.g., capacitor placement) or topological changes (e.g., transmission planning and power restoration).

In one example, the method captures reactive power accurately in a linear model, which leads increased accuracy of voltage magnitudes, reactive power, and line loading. It does this while being fast (low polynomial time). Existing linear models do not capture reactive power accurately because they often do not capture reactive power at all. Further, nonlinear models are not guaranteed to converge, especially outside operating conditions.

(a) AC Power Flow Behavior

Before presenting the models, it is useful to review the behavior of AC power flows, which is the main driver in the derivation. The high-level behavior of power systems is often characterized by two rules of thumb in the literature:

(1) Phase angles are the primary factor in determining the flow active power;
(2) Differences in voltage magnitude are the primary factor in determining the flow of reactive power.

This section examines these experimentally to guide our linear-programming approximation of the AC-flow equations in a cold-start context. The experiments make two basic assumptions:

(1) In the per unit system, voltages do not vary far from 1.0 and $\theta° \in [-\pi/36, -\pi/36]$;
(2) The magnitude of a line conductance is much smaller than the magnitude of the susceptance, i.e., $|g| \ll |b|$.

We can then explore the bounds of the power flow equations (7) and (8), when the voltages are in the following bounds: $|\tilde{V}_n|=1.0$, $|\tilde{V}_m| \in (1.2, 0.8)$, and $\theta_n° - \theta_m° \in (-\pi/6, \pi/6)$. In some applications, these are generous bounds that exceed normal operating conditions of all buses in the standard IEEE power system benchmarks: The motivation here is also to see how active and reactive power behave outside normal operating conditions.

FIG. 4(a) presents the contour of the (a) active power and (b) reactive power equations for a line (n,m) under these assumptions when $\tilde{Y}_{nm}=0.2-i1$. The contour lines indicate significant changes in power flow. Consider first the active power plot in FIG. 4(a). For a fixed voltage, varying the phase angle difference induces significant changes in active power as many lines are crossed. In contrast, for a fixed phase angle difference, varying the voltage has limited impact on the active power, since few lines are crossed. Hence, FIG. 4(a) indicates that phase angle differences are the primary factor of active power flow while voltage differences have only a small effect.

The situation is quite different for reactive power in FIG. 4(b). For a fixed voltage, varying the phase angle difference induces some significant changes in reactive power as around four lines can be crossed. But, if the phase angle difference is fixed, varying voltage induces even more significant changes in reactive power since as many as seven lines may now be crossed. Hence, changes in voltages are the primary factor of reactive power flows but the phase angle differences also have a significant influence.

(b) Hot-Start Linear-Programming Approximation

The linear-programming approximation of the AC Power flow equations in a hot-start context is based on three ideas:

1. It uses the voltage magnitude $|\tilde{V}_n^h|$ from the AC base-point solution at bus n;
2. It approximates $\sin(x)$ by $x$;
3. It uses a piecewise-linear approximation of the cosine.

The piecewise-linear approximation produces a set of inequalities. If $\widehat{\cos}(\theta_n° - \theta_m°)$ denotes the piecewise-linear approximation of $\cos(\theta_n° - \theta_m°)$, then the linear-programming approximation solves the following constraints:

$$\hat{p}_{nm}^h = |\tilde{V}_n^h|^2 g_{nm} - |\tilde{V}_n^h||\tilde{V}_m^h| g_{nm} \widehat{\cos}(\theta_n° - \theta_m°) - |\tilde{V}_n^h||\tilde{V}_m^h| b_{nm}(\theta_n° - \theta_m°) \tag{10}$$

$$\hat{q}_{nm}^h = -|\tilde{V}_n^h|^2 b_{nm} - |\tilde{V}_n^h||\tilde{V}_m^h| b_{nm} \widehat{\cos}(\theta_n° - \theta_m°) - |\tilde{V}_n^h||\tilde{V}_m^h| g_{nm}(\theta_n° - \theta_m°) \tag{11}$$

The piecewise linear approximation is computed for a domain (l,h) and a number of desired segments s. A domain $(-\pi/2, \pi/2)$ is reasonable although, in practice, $\theta_n° - \theta_m°$ is typically very small and a tighter domain may be chosen.

FIG. 5(a) illustrates an example approximation approach using seven linear inequalities. The dark black line (510) shows the cosine function, the dashed lines (520, 522, 524, 526, 528, 530, 532) are the linear inequality constraints, and the shaded area (540) is the feasible region of the linear system formed by those constraints.

The inequalities are obtained from tangents to points of the function. Specifically, for a point x, the tangent is $0 = -\sin(x)(x' - x) - (y' - \cos(x))$ and, within the domains of $(-\pi/2, \pi/2)$, the following inequality holds:

$$\cos(x) \leq -\sin(x)(x' - x) - (y' - \cos(x)).$$

FIG. 5(b) provides, an example algorithm to generate s inequalities evenly placed within (l,h) such as $(-\pi/2, \pi/2)$ in FIG. 4(a). In the algorithm, x is a decision variable used as an argument of the cosine function and $x_{\widehat{\cos}}$ is a decision variable capturing the approximate value of $\cos(x)$.

Advantageously, this approximation captures the cosine contribution to reactive power.

However, the applicability of the model might be limited since, for example, placing tight bounds on reactive power can easily make the model infeasible. This is because reactive power is greatly effected by changes in voltage magnitudes as we now discuss.

Model 1: Hot-Start Linear Programming Approximation

Inputs:
PN=⟨N,L,G,s⟩—the power network
$|\tilde{V}^h|$—voltage magnitudes from an AC base-point solution
cs—cosine approximation segment count Variables:
$\theta_n° \in (-\infty, \infty)$—phase angle on bus n (radians)
$\widehat{\cos}_{nm} \in (0,1)$—Approximation of $\cos(\theta_n° - \theta_m°)$ Maximize:

$$\sum_{(n,m) \in L} \widehat{\cos}_{nm} \tag{M1.1}$$

Subject to:

$$\theta_s^\circ = 0 \tag{M1.2}$$

$$p_n = \sum_{m \in N}^{n \sim m} \hat{p}_{nm}^h \quad \forall n \in N \; n \neq s \tag{M1.3}$$

$$q_n = \sum_{m \in N}^{n \sim m} \hat{q}_{nm}^h \quad \forall n \in N \; n \neq s \; n \notin G \; \forall \langle n,m \rangle,$$
$$\langle m,n \rangle \in L \tag{M1.4}$$

$$\hat{p}_{nm}^h = |\tilde{V}_n^h|^2 g_{nm} - |\tilde{V}_n^h\|\tilde{V}_m^h|(g_{nm}\widehat{\cos}_{nm} + b_{nm}(\theta_n^\circ - \theta_m^\circ)) \tag{M1.5}$$

$$\hat{q}_{nm}^h = -|\tilde{V}_n^h|^2 b_{nm} - |\tilde{V}_n^h\|\tilde{V}_m^h|(g_{nm}(\theta_n^\circ - \theta_m^\circ) - b_{nm}\widehat{\cos}_{nm})) \tag{M1.6}$$

$$PWL\langle \cos \rangle (\widehat{\cos}_{nm}, (\theta_n^\circ - \theta_m^\circ), -\pi/3, \pi/3, cs) \tag{M1.7}$$

(c) Warm-Start Linear-Programming Approximation

This section derives the warm-start LPAC model, i.e., a Linear-Programming model of the AC power flow equations for the warm-start context. The warm-start context assumes that some target voltages $|\tilde{V}^t|$ are available for all buses except voltage-controlled generators whose voltage magnitudes $\tilde{V}_i^g$ are known. In some applications, the network must operate close (e.g., ±0.1 Volts p.u.) to these target voltages, since otherwise the hardware may be damaged or voltages may collapse.

The warm-start LPAC model is based on two key ideas:
1. The active power approximation is the same as in the hot-start model, with the target voltages replacing the voltages in the base-point solution;
2. The reactive power approximation reasons about voltage magnitudes, since changes in voltages are the primary factor of reactive power flows.

To derive the reactive power approximation in the warm-start LPAC model, let $\phi$ be the difference between the target voltage and the true value, i.e., $$|\tilde{V}| = |\tilde{V}^t| + \phi.$$

Substituting in Equation (8), we obtain $$q_{nm} = -(|\tilde{V}_n^t|^2 + 2|\tilde{V}_n^t|\phi_n + \phi_n^2)b_{nm} - (|\tilde{V}_n^t\|\tilde{V}_m^t| + |\tilde{V}_n^t|\phi_m + |\tilde{V}_m^t|\phi_n + \phi_n\phi_m)(g_{nm}\sin(\theta_n^\circ - \theta_m^\circ) - b_{nm}\cos(\theta_n^\circ - \theta_m^\circ)) \tag{12}$$

Dividing the terms into hot-start and cold-start part gives $$q_{nm} = q_{nm}^t + q_{nm}^\Delta \tag{13}$$

where $q_{nm}^t$ is Equation (8) with $|\tilde{V}| = |\tilde{V}^t|$ and $q_{nm}^\Delta$ captures the remaining terms, i.e., $$q_{nm}^\Delta = -(2|\tilde{V}_n^t|\phi_n + \phi_n^2)b_{nm} - (|\tilde{V}_n^t|\phi_m + |\tilde{V}_m^t|\phi_n + \phi_n\phi_m)(g_{nm}\sin(\theta_n^\circ - \theta_m^\circ) - b_{nm}\cos(\theta_n^\circ - \theta_m^\circ)) \tag{14}$$

This equation is equivalent to Equation (8), which is now linearized to obtain the LPAC model.

The $q_{nm}^t$ part has target voltages and may thus be approximated like $\hat{q}_{nm}^h$. The $q_{nm}^\Delta$ is more challenging as it contains nonlinear and non-convex terms such as $\phi_n \phi_m \cos(\theta_n^\circ - \theta_m^\circ)$. We approximate $q_{nm}\Delta$ using the linear terms of the Taylor series of $q_{nm}\Delta$ at $\theta_n^\circ - \theta_m^\circ = 0$ to obtain $$\hat{q}_{nm}\Delta = -(2|\tilde{V}_n^t|\phi_n)b_{nm} + (|\tilde{V}_n^t|\phi_m + |\tilde{V}_m^t|\phi_n)b_{nm} \tag{15}$$

or, equivalently, $$\hat{q}_{nm}\Delta = -|\tilde{V}_n^t|b_{nm}(\phi_n - \phi_m) - (|\tilde{V}_n^t| - |\tilde{V}_m^t|)b_{nm}\phi_n \tag{16}$$

An example linear program for this formulation is presented in Model 2.

Model 2: Warm-Start Linear Programming Approximation
Inputs:
PN=⟨ N, L, G, s ⟩—the power network
$|\tilde{V}^t|$—target voltage magnitudes
cs—cosine approximation segment count
Variables:
$\theta_n^\circ \in (-\infty, \infty)$—phase angle on bus n (radians)
$\phi_n \in (-|V^t|, \infty)$—voltage change on bus n (Volts p.u.)
$\sum_{\langle n,m \rangle \in L} \widehat{\cos}_{nm\;nm} \in (0,1)$—approximation of $\cos(\theta_n^\circ - \theta_m^\circ)$
Maximize:

$$\sum_{\langle n,m \rangle \in L} \sum_{\langle n,m \rangle \in L} \widehat{\cos}_{nm\;nm} \tag{M2.1}$$

Subject to:

$$\theta_s^\circ = 0, \phi_s = 0 \tag{M2.2}$$

$$\phi_i = 0 \; \forall i \in G \tag{M2.3}$$

$$p_n = \sum_{m \in N}^{n \sim m} \hat{p}_{nm}^t \quad \forall n \in N \; n \neq s \tag{M2.4}$$

$$q_n = \sum_{m \in N}^{n \sim m} \hat{q}_{nm}^t + \hat{q}_{nm}^\Delta \quad \forall n \in N \; n \neq s \; n \notin G \; \forall \langle n,m \rangle,$$
$$\langle m,n \rangle \in L \tag{M2.5}$$

$$\hat{p}_{nm}^t = |\tilde{V}_n^t|^2 g_{nm} - |\tilde{V}_n^t\|\tilde{V}_m^t|(g_{nm}\sum_{\langle n,m \rangle \in L}\widehat{\cos}_{nm\;nm} + b_{nm}(\theta_n^\circ - \theta_m^\circ)) \tag{M2.6}$$

$$\hat{q}_{nm}^t = -|\tilde{V}_n^t|^2 b_{nm} - |\tilde{V}_n^t\|\tilde{V}_m^t|(g_{nm}(\theta_n^\circ - \theta_m^\circ) - b_{nm}\sum_{\langle n,m \rangle \in L}\widehat{\cos}_{nm\;nm}) \tag{M2.7}$$

$$\hat{q}_{nm}^\Delta = -|\tilde{V}_n^t|b_{nm}(\phi_n - \phi_m) - (|\tilde{V}_n^t| - |\tilde{V}_m^t|)b_{nm}\phi_n \tag{M2.8}$$

$$PWL\langle \cos \rangle (\sum_{\langle n,m \rangle \in L}\widehat{\cos}_{nm\;nm}, (\theta_n^\circ - \theta_m^\circ), -\pi/3, \pi/3, cs) \tag{M2.9}$$

The inputs to the model are:
(1) A power network PN=⟨ N,L,G,s ⟩, where N is the set of buses, L is the set of lines, G is the set of voltage-controlled generators, s is the slack bus;
(2) the target voltages $|V^t|$ for the buses and
(3) the number of segments cs for approximating the cosine function.

The objective function (M2.1) maximizes the cosine approximation to make it as close as possible to the true cosine.

The constraints are:

Constraints (M2.2) model the slack bus, which has fixed voltage and phase angle.

Constraints (M2.3) capture the voltage-controlled generators which, by definition, do not vary from their voltage target $|V^t|$.

Constraints (M2.4) and (M2.5) model KCL on the buses, as well as the effects of voltage change presented in Equation (16). Like in AC power flow models, the KCL constraints are not enforced on the slack bus for both active and reactive power and on voltage-controlled generators for reactive power.

Constraints (M2.6) and (M2.7) capture the approximate line flows from Equations (10) and (11).

Constraints (M2.8) model the effects of voltage change presented in Equation (16).

Constraints (M2.9) define a system of inequalities capturing the piecewise-linear approximation of the cosine terms in the domain $(-\pi/3, \pi/3)$ using cs line segments for each line in the power network.

(d) Cold-Start Linear-Programming Approximation

We now conclude by presenting the cold-start LPAC model. In a cold-start context, no target voltages are available and voltage magnitudes are approximated by 1.0, except for voltage-controlled generators whose voltages are given by $|\tilde{V}_n^g|$ ($n \in G$). The cold-start LPAC model is then derived from the warm-start LPAC model by fixing $|\tilde{V}_i^t|=1$ for all $i \in N$. Equation (16) then reduces to $$\hat{q}_{nm}^{\Delta} = -b_{nm}(\phi_n - \phi_m) \tag{17}$$

Model 3 sets out the cold-start LPAC model, which is very close to the warm-start model. Note that Constraints (M3.3) use $\phi_i$ to fix the voltage magnitudes of generators.

Model 3: Cold-Start Linear Programming Approximation

Inputs:
PN=⟨N,L,G,s⟩—the power network
cs—cosine approximation segment count
Variables:
$\theta_n^° \in (-\infty,\infty)$—phase angle on bus n (radians)
$\phi_n \in (-|V^t|,\infty)$—voltage change on bus n (Volts p.u.)
$\sum_{(n,m)\in L} \widehat{\cos}_{nm\ nm} \in (0,1)$—approximation of $\cos(\theta_n^° - \theta_m^°)$
Maximize:

$$\sum_{(n,m)\in L} \sum_{(n,m)\in L} \widehat{\cos}_{nm\ nm} \tag{M3.1}$$

Subject to:

$$\theta_s^° = 0, \phi_s = 0 \tag{M3.2}$$

$$\phi_i = |\tilde{V}_i^g| - 1.0 \quad \forall i \in G \tag{M3.3}$$

$$p_n = \sum_{m\in N}^{n\neq m} \hat{p}_{nm}^t \quad \forall n \in N\ n \neq s \tag{M3.4}$$

$$q_n = \sum_{m\in N}^{n\neq m} \hat{q}_{nm}^t + \hat{q}_{nm}^{\Delta} \quad \forall n \in N\ n \neq s\ n \notin G\ \forall \langle n,m \rangle,$$
$$\langle m,n \rangle \in L \tag{M3.5}$$

$$\hat{p}_{nm}^t = g_{nm} - g_{nm} \sum_{(n,m)\in L} \widehat{\cos}_{nm\ nm} + b_{nm}(\theta_n^° - \theta_m^°)) \tag{M3.6}$$

$$\hat{q}_{nm}^t = -b_{nm} - g_{nm}(\theta_n^° - \theta_m^°) - b_{nm}\sum_{(n,m)\in L}\widehat{\cos}_{nm\ nm}) \tag{M3.7}$$

$$\hat{q}_{nm}^{\Delta} = -b_{nm}(\phi_n - \phi_m) \tag{M3.8}$$

$$PWL\langle\cos\rangle(\sum_{(n,m)\in L}\widehat{\cos}_{nm\ nm},(\theta_n^° - \theta_m^°),-\pi/3,\pi/3,cs) \tag{M3.9}$$

(e) Extensions to the LPAC Model

The LPAC model can be used to solve the AC power flow equations approximately in a variety of contexts: Hot-start and cold-start contexts, as well as situations in which voltage targets are available. This section reviews how to generalize the LPAC model for applications in disaster management, reactive voltage support, and vulnerability analysis.

(i) Generators

The LPAC Model can easily be generalized to include ranges for generators: Simply remove the generator from G and place operating limits on the p and q variables for that bus. In that formulation, voltage-controlled generators can also be accommodated by fixing $\phi_n$ to zero at bus n.

(ii) Removing the Slack Bus

By necessity, AC solvers generally use a slack bus to ensure the flow balance in the network when the total power consumption is not known a priori (e.g., due to line losses). As a consequence, the LPAC Model also uses a slack bus so that the AC and DC models can be accurately compared in our experimental results. However, it is important to emphasize that the LPAC model does not need a slack bus and the only reason to include a slack bus in this model is to allow for meaningful comparisons between the LPAC and AC models. As discussed above, the LPAC model can easily include a range for each generator, thus removing the need for a slack bus.

(iii) Load Shedding

For applications in power restoration, the LPAC model can also integrate load shedding: Simply transform the loads into decision variables with an upper bound and maximize the load served. The cosine maximization should also be included in the objective but with a smaller weight. Experimental results on power restoration will be presented later.

(iv) Modeling Additional Constraints

In practice, feasibility constraints may exist on the acceptable voltage range, the reactive injection of a generator, or line flow capacities. Because Model 1 is a linear program, it can incorporate such constraints. For instance, constraint $$|\underline{V}| \leq |V_n^t| + \phi_n \quad \forall n \in N$$

ensures that voltages are above a certain limit $|\underline{V}|$, constraint $$\sum_{m\in N}^{n\neq m} \hat{q}_{nm}^t + \hat{q}_{nm}^{\Delta} \leq \overline{q_n} \quad \forall n \in G$$

limits the maximum reactive injection bounds at bus n to $\overline{q_n}$. Finally, let $\overline{|S_{nm}|}$ be the maximum apparent power on a line from bus n to bus m. Then, constraint $$(\hat{p}_{nm}^t)^2 + (\hat{q}_{nm}^t + \hat{q}_{nm}^{\Delta})^2 \leq \overline{|S_{nm}|}^2$$

ensures that line flows are feasible in the LPAC model. The quadratic functions can be approximated by piece-wise-linear constrains. The auxiliary variables need not appear in the objective as they are constrained from above by $\overline{|S_{nm}|}^2$.

Accuracy Analysis of LPAC Model

This section evaluates the accuracy of the LPAC model which was extended to include line charging, bus shunts, and transformers, as discussed above. It includes (a) a detailed analysis of the model accuracy and (b) an investigation of additional approximations.

The experiments were performed on nine traditional power-system benchmarks which come from the IEEE test systems and Matpower. The AC power flow equations were solved with a Newton-Raphson solver which was validated using Matpower. The LPAC models use 20 line segments in the cosine approximation and all of the models solved in less than 1 second. The results also include a modified version of the IEEEdd17 benchmark, called IEEEdd17m. The original IEEEdd17 has the slack bus connected to the network by a transformer with $|\hat{T}|=1.05$. The non-linear behavior of transformers induces some loss of accuracy and, because this error occurs at the slack bus in IEEEdd17, it affects all buses in the network. IEEEdd17m resolves this issue by setting $|\hat{T}|=1.00$ and the slack bus voltage to 1.05. This equivalent formulation is significantly better for the LPAC model.

(a) LPAC Model

This section reports empirical evaluations of the LDC and LPAC models in cold-start and hot-start contexts. It reports aggregate statistics for active power (Table 1), bus phase angles (Table 2), reactive power (Table 3), and voltage magnitudes (Table 4). Data for the LDC model is necessarily omitted from Tables 3 and 4 as reactive power and voltages are not captured by that model. In each table, two aggregate values are presented: Correlation (corr) and absolute error ($\Delta$). The units of the absolute error are presented in the headings. Both average ($\mu$) and worst-case (max) values are presented. The worst case can often be misleading: For example a very large value may actually be a very small relative quantity. For this reason, the tables show the relative error (δ) of the value selected by the max operator using the arg-max operator. The relative error is a percentage and is unit-less.

Table 1 indicates uniform improvements in active power flows, especially in the largest benchmarks IEEE118, IEEEdd17, and MP300. Large errors are not uncommon for the linearized DC model on large benchmarks and are primarily caused by a lack of line losses. Due to its asymmetrical power flow equations and the cosine approximation, the LPAC model captures line losses.

TABLE 1

Accuracy of the LPAC Model: Active Power Flows.

| Benchmark | Active Power (MW) | | | |
|---|---|---|---|---|
| | Corr | μ(Δ) | max(Δ) | δ(arg max(Δ)) |
| The LDC Model | | | | |
| ieee14 | 0.9994 | 1.392 | 10.64 | 6.783 |
| mp24 | 0.9989 | 5.659 | 19.7 | 23.65 |
| ieee30 | 0.9993 | 1.046 | 13.1 | 7.562 |
| mp30 | 0.9993 | 0.2964 | 2.108 | 19.36 |
| mp39 | 0.9995 | 7.341 | 43.64 | 6.527 |
| ieee57 | 0.9989 | 1.494 | 8.216 | 8.055 |
| ieee118 | 0.9963 | 3.984 | 56.3 | 44.74 |
| ieeedd17 | 0.9972 | 4.933 | 201.3 | 13.84 |
| ieeedd17m | 0.9975 | 4.779 | 191.1 | 13.23 |
| mp300 | 0.991 | 11.09 | 418.5 | 90.02 |
| The LPAC-Cold Start Model | | | | |
| ieee14 | 0.9989 | 1.636 | 5.787 | 13.13 |
| mp24 | 0.9999 | 1.884 | 6.159 | 2.933 |
| ieee30 | 0.9998 | 0.5475 | 2.213 | 2.523 |
| mp30 | 0.9995 | 0.2396 | 1.641 | 15.07 |
| mp39 | 1 | 2.142 | 8.043 | 3.288 |
| ieee57 | 0.9995 | 0.9235 | 4.674 | 9.728 |
| ieee118 | 1 | 0.622 | 3.708 | 2.038 |
| ieeedd17 | 0.9999 | 1.827 | 30.38 | 2.088 |
| ieeedd17m | 0.9999 | 1.475 | 20.21 | 1.399 |
| mp300 | 0.9998 | 2.455 | 18 | 8.675 |
| The LPAC-Hot Start Model | | | | |
| ieee14 | 1 | 0.1689 | 1.588 | 1.012 |
| mp24 | 1 | 0.6621 | 2.041 | 1.01 |
| ieee30 | 1 | 0.1847 | 2.433 | 1.405 |
| mp30 | 0.9999 | 0.1052 | 0.705 | 6.474 |
| mp39 | 1 | 1.557 | 11.58 | 1.731 |
| ieee57 | 1 | 0.2229 | 2.013 | 1.973 |
| ieee118 | 0.9999 | 0.4386 | 7.376 | 5.862 |
| ieeedd17 | 1 | 0.58 | 22.5 | 1.547 |
| ieeedd17m | 1 | 0.5725 | 21.73 | 1.504 |
| mp300 | 0.9999 | 1.195 | 52.84 | 11.37 |

Table 2 presents the aggregate statistics on bus phase angles. These results show significant improvements in accuracy especially on larger benchmarks. The correlations are somewhat lower than active power, but phase angles are quite challenging from a numerical accuracy standpoint.

TABLE 2

Accuracy of the LPAC Model: Phase Angles.

| Benchmark | Phase Angle (rad) | | | |
|---|---|---|---|---|
| | Corr | μ(Δ) | max(Δ) | δ(arg max(Δ)) |
| The LDC Model | | | | |
| ieee14 | 0.9993 | 0.02487 | 0.04258 | 15.22 |
| mp24 | 0.9997 | 0.01334 | 0.02037 | 15.23 |
| ieee30 | 0.9981 | 0.02831 | 0.04733 | 16.45 |
| mp30 | 0.98 | 0.005658 | 0.01607 | 30.27 |
| mp39 | 0.9951 | 0.0283 | 0.05813 | 85.56 |
| ieee57 | 0.9898 | 0.02244 | 0.05958 | 24.1 |
| ieee118 | 0.9904 | 0.03452 | 0.09026 | 88.41 |
| ieeedd17 | 0.9892 | 0.115 | 0.1395 | 16.09 |
| ieeedd17m | 0.992 | 0.0461 | 0.06924 | 41.88 |
| mp300 | 0.9752 | 0.3103 | 0.4244 | 975.7 |
| The LPAC-Cold Start Model | | | | |
| ieee14 | 0.9971 | 0.004525 | 0.01241 | 5 |
| mp24 | 0.9999 | 0.003539 | 0.008947 | 6.922 |
| ieee30 | 0.9965 | 0.007268 | 0.02413 | 8.386 |
| mp30 | 0.9782 | 0.006236 | 0.01804 | 33.99 |
| mp39 | 0.9989 | 0.006268 | 0.02314 | 34.06 |
| ieee57 | 0.9894 | 0.0179 | 0.05467 | 22.11 |
| ieee118 | 0.9994 | 0.003225 | 0.01354 | 9.633 |
| ieeedd17 | 0.9981 | 0.03648 | 0.05165 | 5.958 |
| ieeedd17m | 0.999 | 0.007207 | 0.02682 | 4.522 |
| mp300 | 0.9984 | 0.01458 | 0.08086 | 38.49 |
| The LPAC-Hot Start Model | | | | |
| ieee14 | 1 | 0.001448 | 0.001829 | 0.6914 |
| mp24 | 1 | 0.001337 | 0.002203 | 2.156 |
| ieee30 | 1 | 0.002345 | 0.002819 | 0.9629 |
| mp30 | 0.9998 | 0.001298 | 0.001774 | 4.775 |
| mp39 | 0.9999 | 0.005315 | 0.006241 | 4.273 |
| ieee57 | 1 | 0.002711 | 0.00357 | 1.776 |
| ieee118 | 0.9999 | 0.005958 | 0.008366 | 2.526 |
| ieeedd17 | 0.9999 | 0.01492 | 0.01719 | 2.419 |
| ieeedd17m | 0.9999 | 0.008443 | 0.01059 | 2.33 |
| mp300 | 0.9997 | 0.03842 | 0.04502 | 18.51 |

Table 3 presents the aggregate statistics on line reactive power flows. They indicate that reactive power flows are generally accurate and highly precise in hot-start contexts. To highlight the model accuracy in cold-start contexts, the reactive flow correlation for the two worst benchmarks, IEEEdd17m and MP300, is presented in FIG. 6.

TABLE 3

Accuracy of the LPAC Model: Reactive Power Flows.

| Benchmark | Reactive Power (MVar) | | | |
|---|---|---|---|---|
| | Corr | μ(Δ) | max(Δ) | δ(arg max(Δ)) |
| The LPAC-Cold Start Model | | | | |
| ieee14 | 0.9895 | 0.8689 | 3.167 | 43.89 |
| mp24 | 0.9992 | 1.505 | 5.245 | 9.309 |
| ieee30 | 0.9975 | 0.3455 | 1.607 | 7.62 |
| mp30 | 0.9991 | 0.3135 | 0.8925 | 3.886 |
| mp39 | 0.9971 | 4.03 | 15.75 | 18.98 |
| ieee57 | 0.9995 | 0.3853 | 1.46 | 5.67 |
| ieee118 | 0.9992 | 0.6326 | 6.109 | 6.808 |
| ieeedd17 | 0.9791 | 3.985 | 48.37 | 40.34 |
| ieeedd17m | 0.9927 | 2.409 | 33.96 | 12.28 |
| mp300 | 0.9943 | 3.584 | 162 | 45.05 |
| The LPAC-Hot Start Model | | | | |
| ieee14 | 0.999 | 0.3313 | 1.027 | 66.27 |
| mp24 | 0.9995 | 1.012 | 4.356 | 7.73 |
| ieee30 | 0.9972 | 0.3196 | 2.139 | 26.26 |
| mp30 | 0.9999 | 0.1152 | 0.3807 | 8.448 |
| mp39 | 0.9974 | 3.547 | 23.51 | 24.15 |
| ieee57 | 0.9994 | 0.3957 | 1.96 | 10.92 |
| ieee118 | 0.9997 | 0.3946 | 4.168 | 5.712 |
| ieeedd17 | 0.9936 | 2.325 | 30.59 | 25.51 |

TABLE 3-continued

Accuracy of the LPAC Model: Reactive Power Flows.

| | Reactive Power (MVar) | | | |
|---|---|---|---|---|
| Benchmark | Corr | μ(Δ) | max(Δ) | δ(arg max(Δ)) |
| ieeedd17m | 0.993 | 2.235 | 39.08 | 14.14 |
| mp300 | 0.9991 | 2.198 | 24.63 | 5.513 |

Table 4 presents the aggregate statistics on bus voltage magnitudes. These results indicate that voltage magnitudes are very accurate on small benchmarks, but the accuracy reduces with the size of the network. The warm-start context brings a significant increase in accuracy in larger benchmarks. To illustrate the quality of these solutions in cold-start contexts, the voltage magnitude correlation for the two worst benchmarks, i.e., IEEEdd17m and MP300, is presented in FIG. 7(a) and FIG. 7(b).

The increase in voltage errors is related to the distance from a load point to the nearest generator. The linearized voltage model incurs some small error on each line. As the voltage changes over many lines, these small errors accumulate. By comparing the percentage of voltage-controlled generator buses in each benchmark |G|/|N| (Table 5) to accuracy in Table 4, the IEEE57 and IEEEdd17 benchmarks indicate that that a low percentage is a reasonable indicator of the voltage accuracy in the cold-start context.

TABLE 4

Accuracy of the LPAC Model: Voltage Magnitudes.

| | Voltage Magnitude (Volts p.u.) | | | |
|---|---|---|---|---|
| Benchmark | Corr | μ(Δ) | max(Δ) | δ(arg max(Δ)) |
| | The LPAC-Cold Start Model | | | |
| ieee14 | 0.9824 | 0.003365 | 0.01328 | 1.258 |
| mp24 | 0.9983 | 0.000676 | 0.003244 | 0.3362 |
| ieee30 | 0.9912 | 0.00246 | 0.01126 | 1.127 |
| mp30 | 0.9884 | 0.002186 | 0.009453 | 0.9723 |
| mp39 | 0.9991 | 0.0007851 | 0.002281 | 0.2157 |
| ieee57 | 0.9723 | 0.01044 | 0.03366 | 3.601 |
| ieee118 | 0.999 | 0.000694 | 0.0045 | 0.4657 |
| ieeedd17 | 0.9649 | 0.01369 | 0.03339 | 3.418 |
| ieeedd17m | 0.9813 | 0.006405 | 0.01573 | 1.654 |
| mp300 | 0.9951 | 0.002207 | 0.01385 | 1.5 |
| | The LPAC-Hot Start Model | | | |
| ieee14 | 0.9998 | 0.0005571 | 0.001207 | 0.1143 |
| mp24 | 0.9997 | 0.0004967 | 0.002024 | 0.2097 |
| ieee30 | 0.9994 | 0.001409 | 0.002415 | 0.2407 |
| mp30 | 1 | 0.0003685 | 0.000669 | 0.06908 |
| mp39 | 0.9984 | 0.001498 | 0.0034 | 0.338 |
| ieee57 | 0.999 | 0.00194 | 0.004861 | 0.5055 |
| ieee118 | 0.9999 | 0.0001885 | 0.001234 | 0.1273 |
| ieeedd17 | 0.994 | 0.008863 | 0.01822 | 1.956 |
| ieeedd17m | 0.9874 | 0.007749 | 0.01545 | 1.592 |
| mp300 | 0.9974 | 0.00224 | 0.01181 | 1.279 |

TABLE 5

The Ratio of Voltage-Controlled Buses.

| ieee14 | mp24 | ieee30 | mp30 | mp39 |
|---|---|---|---|---|
| 35.7% | 45.8% | 20.0% | 20.0% | 30.8% |
| ieee57 | ieee118 | ieeedd17 | mp300 | |
| 12.3% | 45.8% | 7.4% | 24.7% | |

(b) Alternative Linear Models

The formulation of the LPAC model explicitly removes two core assumptions of the traditional LDC model:

1. Although $\cos(\theta_n^\circ - \theta_m^\circ)$ maybe very close to 1, those small deviations are important.
2. Although $|g| \ll |b|$, the conductance contributes significantly to the phase angles and voltage magnitudes.

This section investigates three variants of the LPAC models that reintegrate some of the assumptions of the LDC model. The new models are: (1) the LPAC-C model where only the cosine approximation is used and g=0; (2) the LPAC-G model where only the g value is used and cos(x)=1; (3) the LPAC-CG model where cos(x)=1 and g=0.

Tables 6 and 7 present the cumulative absolute error between the proposed linear formulations and the true nonlinear solutions. Many metrics may be of interest but these results focus on line voltage drop $\tilde{V}_n - \tilde{V}_m$ and bus power $\tilde{S}_n$. These were selected because they are robust to errors which accumulate as power flows through the network.

The results highlight two interesting points. First, all linear models tend to bring improvements over a traditional LDC model. Second, although integrating either the g value or the cosine term brings some small improvement independently, together they make significant improvements in accuracy. Additionally a comparison of Table 6 and Table 7 reveals that the benefits of the new linear models are more pronounced as the network increases.

TABLE 6

Accuracy Comparison of Various Linear Models (Part I).

| | Cumulative Absolute Error | | | |
|---|---|---|---|---|
| Model | $\Re(\tilde{V}_n - \tilde{V}_m)$ | $\Im(\tilde{V}_n - \tilde{V}_m)$ | $p_n$ | $q_n$ |
| | ieee14 | | | |
| LDC | 0.3839 | 0.166 | 13.39 | 118.4 |
| LPAC-A-GC | 0.1561 | 0.1296 | 13.39 | 130.9 |
| LPAC-A-G | 0.1208 | 0.1227 | 13.39 | 110.3 |
| LPAC-A-C | 0.125 | 0.1265 | 8.843 | 41.02 |
| LPAC | 0.0976 | 0.1239 | 1.783 | 11.66 |
| | mp24 | | | |
| LDC | 0.448 | 0.1434 | 53.22 | 792.4 |
| LPAC-A-GC | 0.3676 | 0.1289 | 53.22 | 546.2 |
| LPAC-A-G | 0.2309 | 0.1332 | 53.22 | 314.3 |
| LPAC-A-C | 0.2417 | 0.116 | 53.12 | 476.2 |
| LPAC | 0.03411 | 0.0828 | 6.94 | 64.12 |
| | ieee30 | | | |
| LDC | 0.5429 | 0.2934 | 17.55 | 169.9 |
| LPAC-A-GC | 0.1607 | 0.2377 | 17.55 | 169.1 |
| LPAC-A-G | 0.1276 | 0.2267 | 17.55 | 144.1 |
| LPAC-A-C | 0.1547 | 0.164 | 15.99 | 54.93 |
| LPAC | 0.1254 | 0.148 | 2.9 | 9.799 |
| | mp30 | | | |
| LDC | 0.4341 | 0.1728 | 2.444 | 181 |
| LPAC-A-GC | 0.166 | 0.1584 | 2.444 | 20.78 |
| LPAC-A-G | 0.1616 | 0.1581 | 2.444 | 17.96 |
| LPAC-A-C | 0.06886 | 0.1454 | 2.444 | 9.387 |
| LPAC | 0.07338 | 0.1456 | 1.736 | 6.76 |
| | mp39 | | | |
| LDC | 0.5634 | 0.1997 | 43.64 | 2816 |
| LPAC-A-GC | 0.2449 | 0.2105 | 43.64 | 852.4 |
| LPAC-A-G | 0.1419 | 0.1958 | 43.64 | 295.4 |
| LPAC-A-C | 0.1895 | 0.1867 | 37.65 | 850 |
| LPAC | 0.04444 | 0.1337 | 0.4745 | 143 |

TABLE 7

Accuracy Comparison of Various Linear Models (Part II).

| Model | $\Re(\tilde{V}_n - \hat{V}_m)$ | $\Im(\tilde{V}_n - \hat{V}_m)$ | $p_n$ | $q_n$ |
|---|---|---|---|---|
| *ieee57* | | | | |
| LDC | 1.343 | 0.6803 | 27.9 | 529.1 |
| LPAC-A-GC | 0.4158 | 0.5489 | 27.9 | 265.2 |
| LPAC-A-G | 0.3231 | 0.5311 | 27.9 | 265.7 |
| LPAC-A-C | 0.3748 | 0.4153 | 24.43 | 101.7 |
| LPAC | 0.3634 | 0.3854 | 4.736 | 13.17 |
| *ieee118* | | | | |
| LDC | 3.083 | 1.239 | 132.7 | 2152 |
| LPAC-A-GC | 0.7298 | 0.9944 | 132.7 | 1293 |
| LPAC-A-G | 0.6494 | 0.9928 | 132.7 | 1150 |
| LPAC-A-C | 0.4364 | 0.8553 | 104.3 | 651.3 |
| LPAC | 0.2572 | 0.5249 | 0.7279 | 86.24 |
| *ieeedd17* | | | | |
| LDC | 4.144 | 3.263 | 201.3 | 3857 |
| LPAC-A-GC | 5.783 | 4.881 | 201.3 | 2706 |
| LPAC-A-G | 4.167 | 3.241 | 201.3 | 599.6 |
| LPAC-A-C | 4.159 | 3.478 | 200.5 | 2646 |
| LPAC | 1.131 | 1.017 | 30.38 | 345 |
| *ieeedd17m* | | | | |
| LDC | 3.798 | 1.972 | 191.1 | 3353 |
| LPAC-A-GC | 5.152 | 3.219 | 191.1 | 2032 |
| LPAC-A-G | 3.3 | 2.11 | 191.1 | 408.4 |
| LPAC-A-C | 3.307 | 2.117 | 190.4 | 1968 |
| LPAC | 0.4915 | 0.6314 | 20.21 | 242.1 |
| *mp300* | | | | |
| LDC | 13.76 | 4.689 | 418.5 | 14240 |
| LPAC-A-GC | 11.2 | 5.324 | 418.5 | 5076 |
| LPAC-A-G | 9.819 | 5.171 | 418.5 | 1701 |
| LPAC-A-C | 7.835 | 4.402 | 348.5 | 4969 |
| LPAC | 0.8521 | 1.376 | 9.703 | 829.6 |

Power Restoration Based on LPAC Model

After a significant disruption due to, say, a natural disaster, large sections of the power network need to be re-energized. To understand the effects of restoration actions, power engineers must simulate the network behavior under various courses of action. However, the network is far from its normal operating state, which makes it extremely challenging to solve the AC power flow equations. In fact, the task of finding an AC solution without a reasonable starting point has been regarded as "maddeningly difficult".

The LPAC model studied here has the benefit of providing starting values for all the variables in the AC power flow problem, unlike the traditional LDC which only provides active power values. Furthermore, the LPAC model has the additional advantage of supporting bounds on reactive generation and voltage magnitudes and such constraints are critical for providing feasible solutions to the AC power flow. This section illustrates these benefits.

Before presenting the power-restoration model, it is important to mention the key aspect of this application. When the power system undergoes significant damages, load shedding must occur. The LDC and LPAC models must be embedded in a restoration model that maximizes the served load given operational constraints such as the generation limits. These load values indicate the maximum amount of power that can be dispatched while ensuring system stability.

Model 4 presents a linear program based on the warm-start LPAC model which, given limits on active power generation $\overline{p^g}$ and the desired active and reactive loads $\overline{p^l}, \overline{q^l}$ at each bus, determines the maximum amount of load that can be dispatched. The model assumes that the loads can be shed continuously and that the active and reactive parts of the load should maintain the same power factor.

Model 4: A Linear Program for Maximizing Desired Load

Inputs:
$\overline{p_n^g}$—maximum active injection for bus n
$\overline{p_n^l}$—desired active load at bus n
$\overline{q_n^l}$—desired reactive load at bus n
Inputs from Model 2 (Warm-Start)

Variables:
$p_n^g \in (0, \overline{p_n^g}]$—active generation at bus n
$q_n^g \in (-\infty, \infty)$—reactive generation at bus n
$l_n \in (0,1)$—percentage of load served at bus n
Variables from Model 2 (Warm-Start)

Maximize:

$$\Sigma_{n \in N} l_n \quad \text{(M4.1)}$$

Subject to:

$$p_n = -\overline{p_n^l} + p_n^g \quad \forall n \in N \quad \text{(M4.2)}$$

$$q_n = -\overline{q_n^l} + q_n^g \quad \forall n \in N \quad \text{(M4.3)}$$

$$q_n^g = 0 \quad \forall n \in N \backslash G \quad \text{(M4.4)}$$

$$q_n = \Sigma_{m \in N}^{n \sim m} \hat{q}_{nm}^l + \hat{q}_{nm}^\Delta \quad \forall n \in G \quad \text{(M4.5)}$$

Constraints from Model 2 (Warm-Start)

The objective function (M4.1) maximizes the percentage of served load. Constraints (M4.2) and (M4.3) set the active and reactive injection at bus n, appropriately based on the decision variables for load shedding and generation dispatch. Constraint (M4.4) ensures that reactive generation only occurs at generator buses and Constraint (M4.5) now defines $q^n$ for generator buses as well.

Since it reasons about reactive power and voltage magnitudes, Model 4 can be further enhanced to impose bounds on these values. As we will show, such bounds are often critical to obtain high-quality solutions in power restoration contexts. If a reactive generation bound $\overline{q^g}$ is supplied, this model can be extended by adding the constraint, $$q_n^g \leq \overline{q_n^g} \quad \forall n \in N.$$

Voltage magnitude limits can also be incorporated. Given upper and lower voltage limits $|\tilde{V}|$ and $|\check{V}|$, the constraint $$|\check{V}| \leq 1.0 + \phi_n \leq |\tilde{V}| \quad \forall n \in N.$$

may be used to enforce bounds on voltage magnitudes. The experimental results study the benefits of the LPAC model, suitably enhanced to capture these extensions, for power restoration. They compare a variety of linear models including the LDC model, the LPAC model, and enhancements of the LPAC model with additional constraints on reactive power and voltage magnitudes.

TABLE 8

Power Restoration: Achieving AC Feasibility From Different Models.

| Scenario | LDC | LPAC | LPAC-R | LPAC-R-V |
|---|---|---|---|---|
| N-3 | 997 | 998 | 1000 | 1000 |
| N-4 | 997 | 1000 | 1000 | 1000 |
| N-5 | 944 | 957 | 974 | 1000 |
| N-6 | 973 | 1000 | 999 | 1000 |

TABLE 8-continued

Power Restoration: Achieving AC Feasibility From Different Models.

| Scenario | LDC | LPAC | LPAC-R | LPAC-R-V |
|---|---|---|---|---|
| N-7 | 973 | 985 | 994 | 1000 |
| N-8 | 976 | 979 | 998 | 1000 |
| N-9 | 839 | 940 | 990 | 1000 |
| N-10 | 664 | 674 | 818 | 1000 |
| N-11 | 494 | 623 | 973 | 997 |
| N-12 | 697 | 698 | 981 | 1000 |
| N-13 | 996 | 996 | 1000 | 1000 |
| N-14 | 933 | 933 | 1000 | 1000 |
| N-15 | 936 | 936 | 989 | 1000 |
| N-16 | 696 | 696 | 942 | 1000 |
| N-17 | 350 | 350 | 640 | 1000 |
| N-18 | 1000 | 1000 | 1000 | 1000 |
| N-19 | 798 | 800 | 937 | 1000 |
| N-20 | 1000 | 1000 | 1000 | 1000 |

Table 8 studies the applicability of various linear power models for network restoration on the IEEE30 benchmark. 1000 line outage cases were randomly sampled from each of the N-3, N-4, N-5, . . . , N-20 contingencies. Each contingency is solved with a linear power model (e.g., the LDC model or the LPAC model), whose solution is used as a starting point for the AC model. The performance metric is the number of cases where the AC solver converges, as a good linear model should yield a feasible generation dispatch with a good starting point for the AC solver.

To understand the importance of various network constraints, four linear models are studied: the traditional LDC model; the LPAC model; the LPAC model with constraints on reactive generation (LPAC-R); and the LPAC with constraints on reactive generation and voltage limits (LPAC-R-V). The number of solved models for each of the contingency classes is presented in Table 8.

The results indicate that a traditional LDC model is overly optimistic and often produces power dispatches that do not lead to feasible AC power Wows (the N-11 and N-17 are particularly striking). However, each refinement of the LPAC model solves more contingencies. The LPAC-R-V model is very reliable and is able to produce feasible dispatches in all contingencies except 3 from the N-11 case. This means that the LPAC-R-V model solves 99.98% of the 17,000 contingencies studied.

Table 9 depicts the load shed by the various models. For large contingencies, the LPAC-R-V model not only provides good starting points for an AC solver but its load shedding is only slightly larger than the (overly optimistic) LDC model. These results provide compelling evidence of the benefits of the LPAC model for applications dealing with situations outside the normal operating conditions. In addition, Model 4 can replace the LDC model in power restoration applications that are using MIP models to minimize the size of a blackout over time.

TABLE 9

Power Restoration: Average Load Shedding (% of Total Active Power).

| Scenario | LDC | LPAC | LPAC-R | LPAC-R-V |
|---|---|---|---|---|
| N-3 | 0.653 | 1.376 | 4.507 | 4.578 |
| N-4 | 2.483 | 3.341 | 6.966 | 7.019 |
| N-5 | 1.312 | 2.186 | 5.864 | 7.011 |
| N-6 | 4.271 | 7.652 | 18.8 | 18.87 |
| N-7 | 4.825 | 5.075 | 9.762 | 10.35 |
| N-8 | 47.15 | 47.22 | 47.82 | 48.14 |
| N-9 | 11.4 | 13.57 | 25.22 | 25.35 |

TABLE 9-continued

Power Restoration: Average Load Shedding (% of Total Active Power).

| Scenario | LDC | LPAC | LPAC-R | LPAC-R-V |
|---|---|---|---|---|
| N-10 | 11.92 | 12.02 | 16.75 | 18.4 |
| N-11 | 6.132 | 6.978 | 17.36 | 17.79 |
| N-12 | 19.94 | 20.08 | 27.72 | 28.25 |
| N-13 | 26.81 | 26.83 | 33.11 | 33.19 |
| N-14 | 23.19 | 23.21 | 30.06 | 30.08 |
| N-15 | 19.56 | 19.56 | 24.17 | 25.28 |
| N-16 | 32.22 | 32.23 | 33.8 | 34.19 |
| N-17 | 42.86 | 42.88 | 40.8 | 39.68 |
| N-18 | 35.4 | 35.4 | 39.07 | 39.07 |
| N-19 | 68.1 | 68.22 | 65.27 | 65.38 |
| N-20 | 76.56 | 76.56 | 76.56 | 76.56 |

Capacitor Placement Problem Based on LPAC Model

A simple version of the Capacitor Placement Problem (CPP) is used to demonstrate how the LPAC model can be used as a building block inside a MIP solver for decision-support applications.

Informally speaking, the CPP consists of placing capacitors throughout a power network to improve voltage stability. The version studied here aims at placing as few capacitors as possible throughout the network, while meeting a lower bound $|\tilde{V}|$ on the voltages and satisfying a capacitor injection limit $\overline{q^c}$ and reactive generation limits $\overline{q_n^g}(n \in G)$. Model 5 presents a CPP model based on the cold-start LPAC model. For each bus n, the additional decision variables are the amount of reactive support added by the capacitor $q_n^c$ and a variable $c_n$ indicating whether a capacitor was used.

Model 5: A Linear Program for Capacitor Placement

Inputs:
$\overline{q_n^g}$—injection bound for generator n
$\overline{q^c}$—capacitor injection bound
$|\tilde{V}|$—minimum desired voltage magnitude
Inputs from Model 3 (Cold-Start)

Variables:
$q_n^c \in (0, \overline{q^c})$—capacitor reactive injection
$c_n \in \{0,1\}$—capacitor placement indicator
Variables from Model 3 (Cold-Start)

Minimize:

$$\Sigma_{n \in N} c_n \quad (M5.1)$$

Subject to:

$$|\tilde{V}| \leq 1.0 + \phi_n \leq 1.05 \quad \forall n \in N \quad (M5.2)$$

$$q_n^c \leq M c_n \quad (M5.3)$$

$$q_n \leq \overline{q_n^g} \quad \forall n \in G \quad (M5.4)$$

$$q_n = \Sigma_{m \in N}^{n \sim m} \hat{q}_{nm}^t + \hat{q}_{nm}^\Delta \quad \forall n \in G \quad (M5.5)$$

$$q_n - q_n^c = \Sigma_{m \in N}^{n \sim m} \hat{q}_{nm}^t + \hat{q}_{nm}^\Delta \quad \forall n \in N : n \neq s \land n \notin G \quad (M5.6)$$

Constraints from Model 3 (Cold-Start) except for (M3.5)

The objective function (M5.1) minimizes the number of capacitors. Constraints (M5.2) ensure the voltages do not drop below the desired limit and do not exceed the preferred operating condition of 1.05 Volts p.u. Constraints (M5.3) link the capacitor injection variables with the indicator variables, a standard technique in MIP models. Constraints (M5.4) ensures each generator $n \in G$ does not exceed its reactive generation limit $\overline{q_n^g}$. and constraints (M5.5) defines the reactive power for generators. Lastly, Constraints (M5.6)

redefines the reactive power equation to inject the capacitor contribution $q^c$. The remainder of the model is the same as Model 3 (the cold-start LPAC model).

The CPP model was tested on a modified version of the IEEE57 benchmark. All of the IEEE benchmarks have sufficient reactive support in their normal state. To make an interesting capacitor placement problem, the transformer tap ratios are set to 1.0 and existing synchronous condensers are removed. This modified benchmark (IEEE57-C) has significant voltage problems with several bus voltages dropping below 0.9. By design, a solution to Model 5 satisfies all of the desired constraints. However, Model 5 is based on the LPAC model and is only an approximation of the AC power flow. To understand the true value of Model 5, we solve the resulting solution network with an AC solver and measure how much the constraints are violated. Table 10 presents the results of Model 5 on benchmark IEEE57-C with $\overline{q^c}$=30 and various thresholds $|\tilde{V}|$.

The table presents the following quantities: The minimum desired voltage $|\hat{V}|$; The worst violation of the voltage lower-bound $\min(|\tilde{V}|)$; The worst violation of the voltage upper bound $\max(|\tilde{V}|)$; The worst violation of reactive injection upper bound $\max(q_n)$; The number of capacitors placed $\Sigma c_n$; and the runtime of the MIP to prove the optimal placement solution. The table indicates that the CPP model is extremely accurate and only has minor constraint violations on the lower bounds of the voltage values.

TABLE 10

Capacitor Placement Results on IEEE57-C, $\overline{q^c}$ = 30 MVar

| $|\hat{V}|$ | $\min(|\tilde{V}|)$ | $\max(|\tilde{V}|)$ | $\max(q_n)$ | $\Sigma c_n$ | Time (sec.) |
|---|---|---|---|---|---|
| 0.8850 | 0.000000 | 0.0 | 0.0 | 1 | 1 |
| 0.9350 | 0.000000 | 0.0 | 0.0 | 3 | 8 |
| 0.9600 | 0.000000 | 0.0 | 0.0 | 5 | 157 |
| 0.9750 | −0.005129 | 0.0 | 0.0 | 6 | 196 |
| 0.9775 | −0.004385 | 0.0 | 0.0 | 6 | 120 |
| 0.9800 | −0.000062 | 0.0 | 0.0 | 6 | 86 |
| 0.9840 | −0.001713 | 0.0 | 0.0 | 6 | 46 |

It is important to note that, although the CPP model can take as long as three minutes to prove optimality, it often finds the best solution value within a few seconds. The voltage lower bound approaches the value of 0.985, which is the lowest value of the voltage-controlled generators in the benchmark. These results remain consistent for other voltage bounds.

Once again, the CPP model indicates the benefits of the LPAC approximation for decision-support applications that need to reason about reactive power and voltages.

Comparisons (a) Iterative Methods

Iterative methods, such as the fast-decoupled load flow, generally significantly reduce the computation time of solving the AC equations and demonstrate sufficient accuracy. Their disadvantage however is that they cannot be efficiently integrated into traditional decision-support tools. Indeed, MIP solvers require purely declarative models to obtain lower bounds that are critical in reducing the size of the search space.

Note however that, modulo the linear approximations, the LPAC model can be viewed as solving a decoupled load flow globally. Compared to the iterative methods, 1. Because the model forms one large linear system, all of the steps of the decoupled load flow are effectively solved simultaneously;
2. Because the formulation is a linear program, the values of and can now be decision variables, and bounds may be placed on the line capacities, voltage magnitudes, and phase angles;
3. The model may be embedded in a MIP solver for making discrete decisions about the power system.

In one or more embodiments, the second and third points represent significant advantages over the fast-decoupled load flow and other iterative methods.

(b) Convex Models

Although many variants of the LDC model exist, few declarative models incorporate reactive flows in cold-start contexts. To the inventor(s)' knowledge, three cold-start approaches have been proposed: a polynomial approximation scheme, (2) a semi-definite programming relaxation, and (3) a voltage-difference model.

The polynomial approximation has the advantage of solving a convex relaxation of the AC power equations but the number of variables and constraints needed to model the relaxation "grows rapidly" and only second-order terms were considered. The accuracy of this approach for general power flows remains an open question. One approach focuses on a transmission planning application and does not quantify the accuracy of the approximation relative to an AC power flow.

The semi-definite programming (SDP) relaxation also has the advantage of solving a convex relaxation of the AC power equations. One approach demonstrated that the formulation finds the globally optimal value to the AC optimal power flow problem on a number of traditional benchmarks. This does not hold in general however. SDP, solvers are also less mature than LP solvers and their scalability remains an open question. Finally, solvers integrating discrete variables on top of SDP models are very recent and do not have the scientific maturity of MIP solvers.

The voltage-difference model has a resemblance to a model combining the equation with Equation (17). However, it makes a fundamental assumption that all voltages are the same before computing the voltage differences. In practice, voltage-controlled generators violate this assumption. On traditional power system benchmarks, we observed that the voltage-difference formulation had similar accuracy to the LDC model.

Section 3—QPAC Model

This section introduces the QPAC model for approximating the AC power flow equations. A quadratically constrained model is first derived and a power flow feasibility problem presented.

The QPAC model, which is a convex quadratic approximation of the AC power flow equations, strikes a good compromise between accuracy and efficiency and may be embedded in general purpose discrete optimization solvers. In at least one example, the QPAC approximation also captures the effects of voltage magnitudes and reactive power. Moreover, the approximation is fundamentally driven by the behavior of power systems and the structure of the power flow equations.

Although the QPAC model was inspired by a power restoration application, its implications are much broader. To demonstrate the broad applicability of the model, the QPAC approximation is evaluated on two example case studies of classic power system decision problems: optimal power flow (OPF) and capacitor placement problem. The experimental results show that the QPAC model provides an appealing tradeoff between accuracy and efficiency.

(a) Power Flow Feasibility Problems

Model 6 presents a power flow feasibility problem based on the AC power flow equations which defines the space of feasible flows and forms a standard building block for many AC power flow optimization problem. An example power flow problem generally assumes the following:

(1) load values $\tilde{S}_n^l = p_n^l + iq_n^l$ are fixed;

(2) the generators have bounded continuous operating range, i.e. $\underline{\tilde{S}}_n^g = \underline{p}_n^g + i\underline{q}_n^g$ (lower bound), $\overline{\tilde{S}}_n^g = \overline{p}_n^g + i\overline{q}_n^g$ (upper bound);

(3) voltage magnitudes must remain within a continuous operating range, $|\underline{\tilde{V}}|$ (lower bound) $|\overline{\tilde{V}}|$ (upper bound);

(4) the lines have flow limits $|\overline{\tilde{S}}_{nm}|$.

---

Model 6: AC Power Flow Feasibility Problem

Inputs:

| | |
|---|---|
| $\langle N, E, G, s \rangle$ | the power network |
| $\|\underline{\tilde{V}}_n\|, \|\overline{\tilde{V}}_n\|$ | voltage limits for bus n |
| $\underline{p}_n^g, \overline{p}_n^g$ | active injection limits for bus n |
| $\underline{q}_n^g, \overline{q}_n^g$ | reactive injection limits for bus n |
| $p_n^l, q_n^l$ | active and reactive demands at bus n |
| $g_{nm}, b_{nm}$ | conductance and susceptance of line nm |
| $\|\overline{\tilde{S}}_{nm}\|$ | thermal limit on line nm |

Variables:

| | |
|---|---|
| $\theta_n^o \in (-\infty, \infty)$ | phase angle on bus n (radians) |
| $\|\tilde{V}_n\| \in (\|\underline{\tilde{V}}_n\|, \|\overline{\tilde{V}}_n\|)$ | voltage magnitude on bus n (volts p.u.) |
| $p_n^g \in (\underline{p}_n^g, \overline{p}_n^g)$ | active generation on bus n (MW p.u.) |
| $q_n^g \in (\underline{q}_n^g, \overline{q}_n^g)$ | reactive generation on bus n (MVar p.u.) |
| $p_{nm} \in (-\|\overline{\tilde{S}}_{nm}\|, \|\overline{\tilde{S}}_{nm}\|)$ | active flow on line nm (MW p.u.) |
| $q_{nm} \in (-\|\overline{\tilde{S}}_{nm}\|, \|\overline{\tilde{S}}_{nm}\|)$ | reactive flow on line nm (MVar p.u.) |
| $q_{nm} = -\|\tilde{V}_n\|^2 b_{nm} + \|\tilde{V}_n\|\|\tilde{V}_m\| b_{nm}\cos(\theta_n^o - \theta_m^o) - \|\tilde{V}_n\|\|\tilde{V}_m\| g_{nm}\sin(\theta_n^o - \theta_m^o)$ | |

Solve:

| | |
|---|---|
| $\theta_s^o = 0$ | (M6.1) |
| $p_n^l - p_n^g = \Sigma_{(n,m)\in E} p_{nm}$  $\forall n \in N$ | (M6.2) |
| $q_n^l - q_n^g = \Sigma_{(n,m)\in E} q_{nm}$  $\forall n \in N$ | (M6.3) |
| $\forall \langle n, m \rangle \in E$ | |
| $p_{nm} = \|\tilde{V}_n\|^2 g_{nm} - \|\tilde{V}_n\|\|\tilde{V}_m\|(g_{nm}\cos(\theta_n^o - \theta_m^o) - b_{nm}\sin(\theta_n^o - \theta_m^o))$ | (M6.4) |
| $q_{nm} = -\|\tilde{V}_n\|^2 b_{nm} + \|\tilde{V}_n\|\|\tilde{V}_m\|(b_{nm}\cos(\theta_n^o - \theta_m^o) - g_{nm}\sin(\theta_n^o - \theta_m^o))$ | (M6.5) |
| $p_{nm}^2 + q_{nm}^2 \leq \|\overline{\tilde{S}}_{nm}\|^2$ | (M6.6) |

---

Model 6 presents a power flow feasibility problem based on the AC power flow equations. The inputs and decision variables are defined in the model. Many of the continuous operating limits of the network are captured in the variable bounds. The constraints are as follows: Constraint (M6.1) fixes the angle of the slack bus to eliminate some numerical symmetries. Constraint (M6.2) and (M6.3) enforce flow conservation (KCL) on each of the buses. Constraint (M6.4) and (M6.5) enforce Ohm's Law on each of the lines. Finally, constraint (M6.6) captures the line loading limit.

Model 7 presents a power flow feasibility problem based on the traditional DC power flow equations. The latter equations only capture the flow of active power in the network and therefore must ignore constraints on reactive power and voltage magnitudes. The reduced inputs, decision variables, and constraints are defined in model 7.

---

Model 7: DC Power Flow Feasibility Problem

Inputs:

| | |
|---|---|
| $\langle N, E, G, s \rangle$ | the power network |
| $\underline{p}_n^g, \overline{p}_n^g$ | active injection limits for bus n |
| $p_n^l, q_n^l$ | active and reactive demands at bus n |
| $b_{nm}$ | susceptance of line nm |
| $\|\overline{\tilde{S}}_{nm}\|$ | thermal limit on line nm |

Variables:

| | |
|---|---|
| $\theta_n^o \in (-\infty, \infty)$ | phase angle on bus n (radians) |
| $P_n^g \in (\underline{p}_n^g, \overline{p}_n^g)$ | active generation on bus n (MW p.u.) |
| $p_{nm} \in (-\|\overline{\tilde{S}}_{nm}\|, \|\overline{\tilde{S}}_{nm}\|)$ | active flow on line nm (MW p.u.) |
| $q_{nm} = -\|\tilde{V}_n\|^2 b_{nm} + \|\tilde{V}_n\|\|\tilde{V}_m\| b_{nm}\cos(\theta_n^o - \theta_m^o) - \|\tilde{V}_n\|\|\tilde{V}_m\| g_{nm}\sin(\theta_n^o - \theta_m^o)$ | |

Solve:

| | |
|---|---|
| $\theta_s^o = 0$ | (M7.1) |
| $p_n^l - p_n^g = \Sigma_{(n,m)\in E} p_{nm}$  $\forall n \in N$ | (M7.2) |
| $p_{nm} = -b_{nm}(\theta_n^o - \theta_m^o)$  $\forall \langle n, m \rangle \in E$ | (M7.3) |

---

(b) Power Losses

The power loss on transmission line $\langle n, m \rangle$ is the absolute value of the difference between the amount of power sent at bus n and the one received at bus m.

$$p_{nm}^{loss} = p_{nm} + p_{mn} = g_{nm}(|\tilde{V}_n|^2 + |\tilde{V}_m|^2 - 2|\tilde{V}_n||\tilde{V}_m|\cos(\theta_n^o - \theta_m^o)) \qquad (18)$$

$$q_{nm}^{loss} = q_{nm} + q_{mn} = -b_{nm}(|\tilde{V}_n|^2 + |\tilde{V}_m|^2 - 2|\tilde{V}_n||\tilde{V}_m|\cos(\theta_n^o - \theta_m^o)) \qquad (19)$$

Explicitly factoring the power loss term in the power flow equations yields the equivalent line flow equations:

$$p_{nm} = \frac{p_{nm}^{loss}}{2} + g_{nm}\frac{\left(|\tilde{V}_n|^2 - |\tilde{V}_m|^2\right)}{2} - |\tilde{V}_n||\tilde{V}_m| b_{nm}\sin(\theta_n^o - \theta_m^o) \qquad (20)$$

$$q_{nm} = \frac{q_{nm}^{loss}}{2} - b_{nm}\frac{\left(|\tilde{V}_n|^2 - |\tilde{V}_m|^2\right)}{2} - |\tilde{V}_n||\tilde{V}_m| g_{nm}\sin(\theta_n^o - \theta_m^o) \qquad (21)$$

Note that although the LPAC model in Section 2 implicitly captures the power losses in the AC power flow equations, the power losses may be factored out and explicitly represented according to equations (20) and (21) in the LPAC model.

(c) Convex Quadratic Approximations

Tight convex approximations of the trigonometric functions involved in the power flow equations may be derived as follows. In one example, the second order Taylor expansions of the cosine and sine functions are used; see FIG. 8(a) and FIG. 8(b) respectively:

$$\cos(\theta_n^o - \theta_m^o) \approx 1 - \frac{(\theta_n^o - \theta_m^o)}{2} \qquad (22)$$

and $$\sin(\theta_n^o - \theta_m^o) \approx (\theta_n^o - \theta_m^o) \qquad (23)$$

These approximations are quite accurate within the bounds $-\pi/2 \le \theta_n° - \theta_m° \le \pi/2$, which are generous given that typical operating bounds in power networks are $\pm\pi/35$. Now, active and reactive power losses in equations (18) and (19) may be approximated respectively as follows:

$$\hat{p}_{nm}^{loss} = g_{nm}\left(|\tilde{V}_n|^2 + |\tilde{V}_m|^2 - 2|\tilde{V}_n||\tilde{V}_m|\left(1 - \frac{(\theta_n° - \theta_m°)^2}{2}\right)\right)$$

$$= g_{nm}\left((|\tilde{V}_n| - |\tilde{V}_m|)^2 + |\tilde{V}_n||\tilde{V}_m|(\theta_n° - \theta_m°)^2\right)$$

$$\hat{q}_{nm}^{loss} = -b_{nm}\left(|\tilde{V}_n|^2 + |\tilde{V}_m|^2 - 2|\tilde{V}_n||\tilde{V}_m|\left(1 - \frac{(\theta_n° - \theta_m°)^2}{2}\right)\right)$$

$$= -b_{nm}\left((|\tilde{V}_n| - |\tilde{V}_m|)^2 + |\tilde{V}_n||\tilde{V}_m|(\theta_n° - \theta_m°)^2\right)$$

The next approximation step consists of replacing the voltage product $|\tilde{V}_n||\tilde{V}_m|$ by a given nominal value (e.g., 1 per unit) in all power equations, namely (18), (19), (20), and (21). Furthermore, in the power loss equations, artificial variables are introduced to convexify the quadratic equations, defining the convex feasible region as follows:

$$\hat{v}_{nm} \ge (|\tilde{V}_n| - |\tilde{V}_m|)^2 \tag{24}$$

$$\hat{t}_{nm} \ge (\theta_n° - \theta_m°)^2 \tag{25}$$

$$\hat{p}_{nm}^{loss} = g_{nm}(\hat{v}_{nm} + \hat{t}_{nm}) \tag{26}$$

$$\hat{q}_{nm}^{loss} = -b_{nm}(\hat{v}_{nm} + \hat{t}_{nm}) \tag{27}$$

Figure 8A:
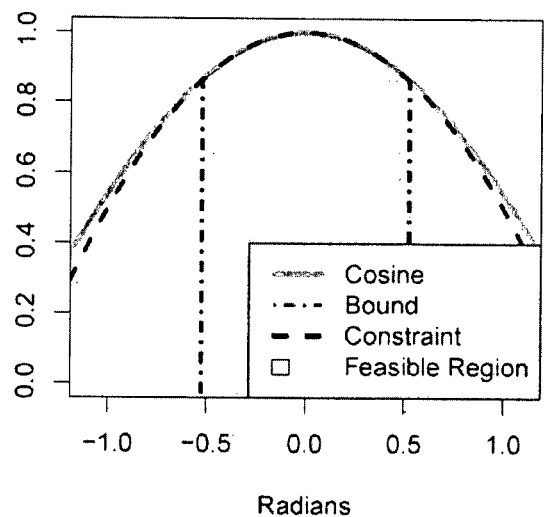
FIG. 8($a$) is a plot of second-order Taylor approximation of cosine terms defining AC power flows.
Figure 8B:
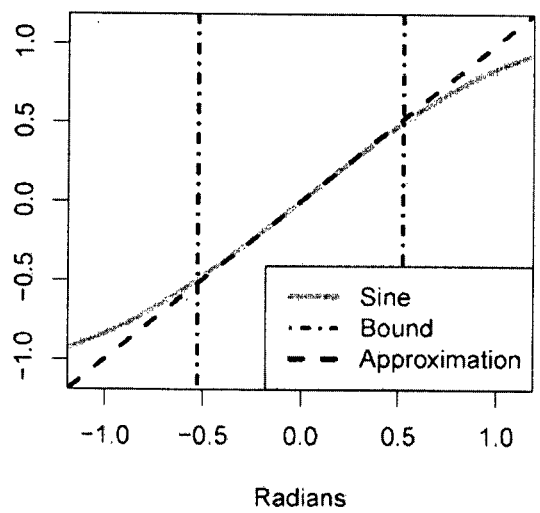
Figure 8C:
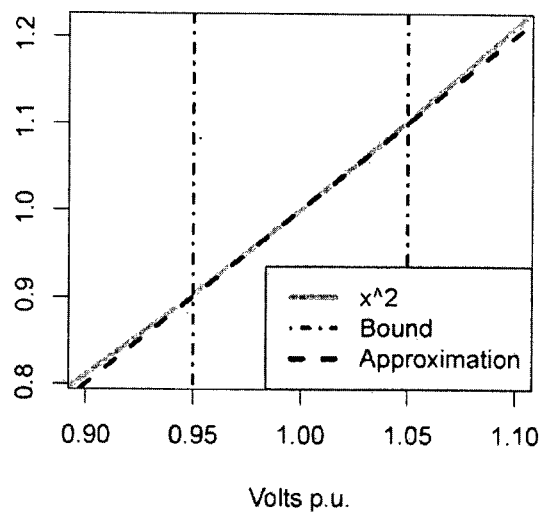

Finally, in the power flow equations (20)-(21), we approximate the voltage square terms using a linear outer-approximation obtained by generating a tangent line around a given nominal value (e.g., 1 per unit) as shown in FIG. 8(c), giving us $$\widehat{vv}_n = 2|\tilde{V}_n| - 1 \tag{28}$$

$$\hat{p}_{nm} = \frac{\hat{p}_{nm}^{loss}}{2} + g_{nm}\frac{(\widehat{vv}_n - \widehat{vv}_m)}{2} - b_{nm}(\theta_n° - \theta_m°) \tag{29}$$

$$\hat{q}_{nm} = \frac{\hat{q}_{nm}^{loss}}{2} - b_{nm}\frac{(\widehat{vv}_n - \widehat{vv}_m)}{2} - g_{nm}(\theta_n° - \theta_m°). \tag{30}$$

The complete QPAC approximation is defined by the system of constraints (24)-(30):

$$\begin{cases} \hat{p}_{nm} = \frac{\hat{p}_{nm}^{loss}}{2} + g_{nm}\frac{(\widehat{vv}_n - \widehat{vv}_m)}{2} - b_{nm}(\theta_n° - \theta_m°) \\ \hat{q}_{nm} = \frac{\hat{q}_{nm}^{loss}}{2} - b_{nm}\frac{(\widehat{vv}_n - \widehat{vv}_m)}{2} - g_{nm}(\theta_n° - \theta_m°) \\ \hat{p}_{nm}^{loss} = g_{nm}(\hat{v}_{nm} + \hat{t}_{nm}) \\ \hat{q}_{nm}^{loss} = -b_{nm}(\hat{v}_{nm} + \hat{t}_{nm}) \\ \hat{v}_{nm} \ge (|\tilde{V}_n| - |\tilde{V}_m|)^2 \\ \hat{t}_{nm} \ge (\theta_n° - \theta_m°)^2 \\ \widehat{vv}_n = 2|\tilde{V}_n| - 1 \end{cases} \quad (QPAC)$$

In summary, the approximations in this model are: (1) a second order Taylor approximation of sine and cosine terms; (2) a linear approximation of $|\tilde{V}_n|^2$; (3) the simplification of voltage products $|\tilde{V}_n||\tilde{V}_m|=1.0$; and (4) relaxing all quadratic equations into inequalities. These approximations exploit the nominal value of voltage magnitudes and phase angle differences, which allows us to exploit fundamental properties arising in the physics of power flows and hence to develop a convex approximation with unprecedented accuracy.

(d) Convex Quadratic Feasible Power Flow

Building on (QPAC), Model 8 presents a power flow feasibility problem for given load and voltage limit on each bus, a set of generators with predefined injection limits and thermal capacity on connection lines. The problem consists of finding a flow satisfying Kirchhoffs law, the bound constraints and meeting all the desired loads. The inputs and decision variables are similar to the ones defined in Model 6. Variables $\hat{p}_{nm}^{loss}$ and $\hat{q}_{nm}^{loss}$ model respectively the active and reactive power loss on line $\langle n, m \rangle$, while variables $\widehat{vv}_n$, $\hat{v}_{nm}$, and $\hat{t}_{nm}$ define the convex relaxations of all quadratic terms found in the system (QPAC).

| Model 8: QPAC Power Flow Feasibility Problem |
| --- |
| Inputs: |
| Inputs from Model 6 (The AC Feasibility Model) |
| Variables: |
| Variables from Model 6 (The AC Feasibility Model) |
| $\hat{p}_{nm}^{loss} \in (0, |\overline{S}_{nm}|)$ - active losses on line nm (MW p.u.) |
| $\hat{q}_{nm}^{loss} \in (0, |\overline{S}_{nm}|)$ - reactive losses on line nm (MVar p.u.) |
| $\widehat{vv}_n \in (|\tilde{V}_n|^2, |\overline{V}_n|^2)$ - an approximation of $|\tilde{V}_n|^2$ |
| $\hat{v}_{nm} \in (0, \infty)$ - convex relaxation of $(|\tilde{V}_n| - |\tilde{V}_m|)^2$ |
| $\hat{t}_{nm} \in (0, \infty)$ - convex relaxation of $(\theta_n° - \theta_m°)^2$ |
| Solve: |

$$\theta_s° = 0 \tag{M8.1}$$

$$\widehat{vv}_n = 2|\tilde{V}_n| - 1 \tag{M8.2}$$

$$p_n^l - p_n^g = \Sigma_{(n,m)\in E}\hat{p}_{nm} \; \forall \; n \in N \tag{M8.3}$$

$$q_n^l - q_n^g = \Sigma_{(n,m)\in E}\hat{q}_{nm} \; \forall \; n \in N \tag{M8.4}$$

$$\hat{p}_{nm} = \frac{\hat{p}_{nm}^{loss}}{2} + g_{nm}\frac{(\widehat{vv}_n - \widehat{vv}_m)}{2} - b_{nm}(\theta_n° - \theta_m°) \; \forall \langle n, m \rangle \in E \tag{M8.5}$$

$$\hat{q}_{nm} = \frac{\hat{q}_{nm}^{loss}}{2} - b_{nm}\frac{(\widehat{vv}_n - \widehat{vv}_m)}{2} - g_{nm}(\theta_n° - \theta_m°) \; \forall \langle n, m \rangle \in E \tag{M8.6}$$

$$\hat{p}_{nm}^{loss} = g_{nm}(\hat{v}_{nm} + \hat{t}_{nm}) \; \forall \langle n, m \rangle \in E \tag{M8.7}$$

$$\hat{q}_{nm}^{loss} = -b_{nm}(\hat{v}_{nm} + \hat{t}_{nm}) \; \forall \langle n, m \rangle \in E \tag{M8.8}$$

$$\hat{v}_{nm} \ge (|\tilde{V}_n| - |\tilde{V}_m|)^2 \; \forall \langle n, m \rangle \in E \tag{M8.9}$$

$$\hat{t}_{nm} \ge (\theta_n° - \theta_m°)^2 \; \forall \langle n, m \rangle \in E \tag{M8.10}$$

$$p_{nm}^2 + q_{nm}^2 \le |\overline{S}_{nm}|^2 \; \forall \langle n, m \rangle \in E \tag{M8.11}$$

Case Studies

This section describes two case studies to evaluate the potential of the QPAC model in decision-support applications in optimal power flow (a.k.a. economic dispatch) and capacitor placement. The goal is to provide evidence that the (QPAC) model strikes an appealing compromise between efficiency and accuracy on such applications. A comparison between DC, QPAC and the state-of-the-art LPAC model is performed.

It is important to emphasize that all of the power flow models under investigation (i.e. DC, LPAC, QPAC) are only approximations of the AC equations. Despite all of their computational advantages, they do not provide lower bounds on the objective values or ensure that their solution is feasible in the true AC system of equations. To understand the real-world practicality of these models, their outputs should be validated in the AC system of equations. This is achieved by first solving an optimization problem using the approximate model, followed by a validation step featuring the true non-convex nonlinear AC equations. The details of this procedure vary depending on the problem and are described in each case study.

All the optimization models were implemented in AMPL and use both CPLEX 12.5 and Sepa which implements an enhanced Outer-Inner approximation algorithm in Bonmin. The time limit was set to 3600 seconds. In Sepa, mixed-integer linear programs were solved using CPLEX 12.5. The non-convex and nonlinear programs are solved using Ipopt. All experimental results were performed on an Intel. Xeon 1.6 Ghz CPU.

(a) Case Study 1—Optimal Power Flow

The goal of the optimal power flow problem (OPF) is to find the cheapest way to generate power in order to satisfy customers' demand given some quadratic cost functions on generators. For each generator $n \in G$, the cost of generating power is defined by the quadratic function $c_n''(p_n^g)+c_n'(p_n^g)+c_n$. A classic OPF problem consist of minimizing the generation cost $\Sigma_{n \in G} c_n''(p_n^g)^2+c_n'(p_n^g)+c_n$ subject to the AC feasibility constraints defined in Model 6.

For the QPAC model, the OPF problem may be formulated as follows:

---
Model 9: QPAC Optimal Power Flow Problem
---

Inputs:

Inputs from Model 6 (The AC Feasibility Model)
Variables:
Variables from Model 6 (The AC Feasibility Model)

$\hat{p}_{nm}^{loss} \in (0, |\overline{S}_{nm}|)$     active losses on line nm (MW p.u.)
$\hat{q}_{nm}^{loss} \in (0, |\overline{S}_{nm}|)$     reactive losses on line nm (MVar p.u.)
$\widehat{vv}_n \in (|\tilde{V}_n|^2, |\overline{V}_n|^2)$     an approximation of $|\tilde{V}_n|^2$
$\check{v}_{nm} \in (0, \infty)$     convex relaxation of $(|\tilde{V}_n| - |\tilde{V}_m|)^2$
$\hat{q}_{nm} \in (0, \infty)$     convex relaxation of $(\theta_n^o - \theta_m^o)^2$ Minimise:

$\Sigma_{n \in G} c_n''(p_n^g)^2 + c_n'(p_n^g) + c_n$

Solve:

$\theta_s^o = 0$     (M9.1)
$\widehat{vv}_n = 2|\tilde{V}_n| - 1$     (M9.2)
$p_n^l - p_n^g = \Sigma_{(n,m) \in E} \hat{p}_{nm} \forall n \in N$     (M9.3)
$q_n^l - q_n^g = \Sigma_{(n,m) \in E} \hat{q}_{nm} \forall n \in N$     (M9.4)

$\hat{p}_{nm} = \frac{\hat{p}_{nm}^{loss}}{2} + g_{nm}\frac{(\widehat{vv}_n - \widehat{vv}_m)}{2} - b_{nm}(\theta_n^o - \theta_m^o) \forall \langle n, m \rangle \in E$     (M9.5)

$\hat{q}_{nm} = \frac{\hat{q}_{nm}^{loss}}{2} - b_{nm}\frac{(\widehat{vv}_n - \widehat{vv}_m)}{2} - g_{nm}(\theta_n^o - \theta_m^o) \forall \langle n, m \rangle \in E$     (M9.6)

$\hat{p}_{nm}^{loss} = g_{nm}(\check{v}_{nm} + \hat{t}_{nm}) \forall \langle n,m \rangle \in E$     (M9.7)
$\hat{q}_{nm}^{loss} = -b_{nm}(\check{v}_{nm} + \hat{t}_{nm}) \forall \langle n, m \rangle \in E$     (M9.8)
$\check{v}_{nm} \geq (|\tilde{V}_n| - |\tilde{V}_m|)^2 \forall \langle n,m \rangle \in E$     (M9.9)
$\hat{t}_{nm} \geq (\theta_n^o - \theta_m^o)^2 \forall \langle n,m \rangle \in E$     (M9.10)
$p_{nm}^2 + q_{nm}^2 \leq |\overline{S}_{nm}|^2 \forall \langle n,m \rangle \in E$     (M9.11)

---

The goal of this case study is not to demonstrate a new state-of-art-solution to the AC-OPF problem. Instead, we simply show that, on this class of problems the QPAC model is much more accurate than other existing approximations. This is done by first solving the OPF problem with an approximate model (i.e., the QPAC, the LPAC, or the DC model) and the OPF objective function. The OPF solution of these approximate models is converted into a feasible AC solution in the following way. Let $p_n'^g$ be the value of $p_n^g$ in the solution to the approximate OPF problem. We find the closest feasible AC solution by solving Model 6 with the objective function:

$$\text{minimize:} \sum_{n \in G} (p_n'^g - p_n^g)^2.$$

We then measure how much the objective function has changed in making the approximate solution AC feasible. In one example, a very small change may be preferable as it indicates that the approximation model led to an almost AC-feasible solution.

The accuracy results of all models are presented in Table 11 on 13 standard MatPower benchmarks. For each approximate power model a: $O_a$ denotes the objective value in the approximate OPF problem; $O_a^{ac}$ the objective value of the nearest feasible AC solution; and $O_{ac}^*$ the best-known AC feasible objective value. Table 1 reports $$\frac{|O_a - O_a^{ac}|}{O_{ac}^*}$$

for each model. The table indicates that the DC approximation has significant accuracy problems with a relative objective difference ranging from 1.45%-6.20%. The LPAC model is significantly more accurate than the DC model in most cases with a relative objective difference below 5%. The QPAC model is the most accurate approximation with a relative objective difference always below 1%. This indicates that the QPAC model consistently finds nearly feasible solutions to the AC equations. A detailed runtime analysis for these methods is unnecessary as they all solve in a few seconds.

TABLE 11

Accuracy of the Approximate Models on OPF Problems.

| Name | |N| | DC | LPAC | QPAC |
| --- | --- | --- | --- | --- |
| case6ww | 6 | 3.93% | 1.87% | 0.17% |
| case9 | 9 | 1.93% | 0.00% | 0.00% |
| case9Q | 9 | 1.93% | 0.00% | 0.00% |
| case14 | 14 | 6.20% | 0.00% | 0.00% |
| case30 | 30 | 2.33% | 0.59% | 0.13% |
| case30Q | 30 | 2.33% | 0.59% | 0.13% |
| ieee30 | 30 | 7.23% | 0.06% | 0.00% |
| case39 | 39 | 1.45% | 0.00% | 0.00% |
| case57 | 57 | 1.87% | 4.63% | 0.00% |
| case118 | 118 | 3.43% | 0.00% | 0.00% |
| case300 | 300 | 2.19% | 0.00% | 0.00% |
| case2383wp | 2383 | 5.04% | 0.65% | 0.62% |
| case2736sp | 2736 | 2.78% | 0.14% | 0.02% |

(b) Case Study 2—Capacitor Placement

The Capacitor Placement Problem (CPP) is another well-studied application and many variants of the problem exist. This section uses a simple version of the problem to demonstrate how the QPAC model may be used as a building block inside a Mixed Integer Quadratic Program (MIQP) solver for power systems applications that feature discrete variables, a major computational challenge for existing technologies.

Informally speaking, the CPP consists of placing capacitors throughout a power network to improve the voltage profile. The version studied here aims at placing as few capacitors as possible, while meeting a lower bound $|\tilde{V}|$ on the voltages and satisfying a capacitor injection limit $\overline{q}^c$ and reactive generation limits $\overline{q}_n^g (n \in G)$.

Model 9 presents a CPP formulation based on the QPAC feasibility problem (Model 8). For each bus $n \in N$, the additional decision variables are the amount of reactive support added by the capacitor $q_n^c$ and a variable $c_n$ indicating whether a capacitor was placed at that bus.

---
Model 10: A QPAC-Based Capacitor Placement Problem.
---

Inputs:
Inputs from Model 8 (The QPAC Feasibility Model)

| | |
|---|---|
| G | the set of voltage controlled generators $G \subset N$ |
| $\dot{P}_n^g, |\tilde{V}_n^g|$ | generator active injections and voltage magnitudes $n \in G$ |
| $\overline{q}^c$ | capacitor injection bound |
| $|\tilde{V}|$ | minimum desired voltage magnitude |

Variables:
Variables from Model 8 (The QPAC Feasibility Model)

| | |
|---|---|
| $q_n^c \in (0, \overline{q}^c)$ | capacitor reactive injection at bus n |
| $c_n \in \{0, 1\}$ | capacitor placement indicator at bus n |

Minimize:

$\Sigma_{n \in N} c_n$     (M10.1)

Solve:
Constraints from Model 8 (The QPAC Feasibility Model) except (M8.4)

$p_n^g = p_n^g \; \forall n \in G \; n \neq s$     (M10.2)
$|\tilde{V}_n| = |\tilde{V}_n^g| \; \forall n \in G$     (M10.3)
$c_n = 0 \; \forall n \in G$     (M10.4)
$|\tilde{V}| \leq |\tilde{V}_n| \; \forall n \in N$     (M10.5)
$q_n^c \leq \overline{q}^c c_n \; \forall n \in N$     (M10.6)
$q_n^l - q_n^g - q_n^c = \Sigma_{(n,m) \in E} q_{nm} \; \forall n \in N$     (M10.7)

The objective function (M10.1) minimizes the number of installed capacitors in the power network. Constraints (M10.2) and Constraints (M10.3) fix the active injection and voltage magnitudes of the generators while capacitor locations are considered. Constraints (M10.4) prevent placement of capacitors at generation sites as they already have reactive injection capabilities. Constraints (M10.5) ensure the voltages do not drop below the desired limit. Constraints (M10.6) link the capacitor injection variables with the indicator variables. Finally, Constraints (M10.7) redefines the reactive power balance equation to inject the capacitor contribution $q_n^c$. The remainder of the model is the same as the QPAC feasibility problem (Model 8).

Once the approximate capacitor placement problem is solved, it is converted to a feasible AC solution by fixing the discrete variables $c_n$ and solving a fully continuous AC feasibility problem. Note that there is no guarantee that there exists a solution fo this AC feasibility problem. In fact, it will only be feasible if the approximation model was sufficiently accurate in the first phase, given the lack of truly global convergence properties of nonlinear continuous solvers.

The CPP model was tested on a modified version of the MatPower 57-bus benchmark. All of the MatPower benchmarks have sufficient reactive support in their given configurations. To make an interesting capacitor placement problem, the transformer tap ratios are set to 1.0 and existing synchronous condensers are removed. This modified benchmark (MatPower 57-bus-C) has significant voltage problems with several bus voltages dropping below 0.9 volts p.u.

TABLE 12

Performance of the Approximate Models on the CPP.

(a) Accuracy

| $|\tilde{V}|$ | AC | LPAC | QPAC |
|---|---|---|---|
| 0.900 | 3 | 4 | 3 |
| 0.925 | 3 | 4 | 3 |
| 0.950 | 4 | 4 | 4 |
| 0.975 | 5 | 6 | 5 |
| 1.000 | 8 | 9 | 8 |
| 1.025 | 19 | (19) | 19 |

(b) Runtime (in Seconds)

| | AC | QPAC | | LPAC | |
|---|---|---|---|---|---|
| $|\tilde{V}|$ | Bonmin | Cplex | SEPA | Cplex | SEPA |
| 0.900 | >3600 | 13 | 7 | 16 | 4 |
| 0.925 | >3600 | 13 | 7 | 16 | 4 |
| 0.950 | >3600 | 72 | 11 | 8 | 4 |
| 0.975 | >3600 | 43 | 9 | 46 | 8 |
| 1.000 | >3600 | 415 | 26 | 225 | 20 |
| 1.025 | >3600 | 2280 | 58 | 138 | 15 |

Table 12(a) presents the results of the approximation models on benchmark MatPower 57-bus-C with $\overline{q}^c = 30$ and various thresholds of $|\tilde{V}|$. The table presents the objective value (i.e. the minimum number of capacitors placed) for the non-convex nonlinear AC version of the problem, a convex LPAC version of the problem, and a convex QPAC version presented here. The results indicate that the QPAC is highly accurate, while the LPAC has some accuracy limitations. In all cases the QPAC model places the same number of capacitors as the AC model, while the LPAC typically suggests one additional capacitor (due to approximation inaccuracy). Both LPAC and QPAC may be converted into feasible AC solutions, with the only exception being the LPAC model with a voltage bound of $|\tilde{V}|=1.025$, in this case, the selected locations do not lead to a feasible AC solution.

Table 12(b) presents the runtime results of the CPP experiment in detail. The non-convex nonlinear AC model is solved using the nonlinear Branch & Bound algorithm implemented in Bonmin as a heuristic. In this case, there is no optimality guarantees at each node of the Branch & Bound tree and the global algorithm may cut optimal integer solutions. The QPAC and LPAC models are studied with two solving technologies, the MISOCP solver implemented in CPLEX 12.5 and SEPA, an Outer-Inner approximation method exploiting function separability of the quadratic constraints. Regardless of the solving technology, both models are able to prove optimality in less than an hour. There are three key messages in this case study.

1. The LPAC and QPAC models are orders of magnitude more scalable than the nonlinear branch and bound algorithm using the AC power flow equations. The "heuristic" algorithm is in fact plagued by numerical issues with the underlying nonlinear solver, failing to solve nonlinear subproblems on different nodes of the branching tree.
2. The nonlinear branch and bound is purely heuristic: It does not provide any optimality guarantee. The LPAC and QPAC models, in contrast, prove optimality of the solution within the confines of their approximations.

3. The QPAC model is more accurate than the LPAC model, often reducing the number of capacitors used. Moreover, this additional accuracy comes at a reasonable cost in efficiency, striking a good tradeoff between accuracy and efficiency. The QPAC model does not experience numerical issues thanks to the convexity of the feasible region and benefits from scalable mixed-integer linear techniques such as outer-Approximation approaches.

These results on the CPP are particularly encouraging as they demonstrate several cases where the QPAC model can very quickly prove optimality of the model and convert the resulting solution into a high-quality AC-feasible solution. However, it is important to recall that the QPAC (and its competitors) have two limitations: (1) they are only approximations of the AC power flows and do not produce true lower bounds on the objective value; (2) they are convex relaxations of the non-convex equations, thus it is always possible to produce solutions that are inside the convex region. Interestingly, the applications studied here indicate these limitations are not a major issue. The success of the DC power flow approximation suggests that, despite its limitations, the QPAC can still have a profound impact on real-world power system operations.

To summarise, approximations of the AC power flow equations may be broadly grouped into iterative methods and convex models.

Iterative methods, such as the fast-decoupled load flow, significantly reduce the computation time of solving the AC equations and demonstrate sufficient accuracy. Their disadvantage however is that they cannot be efficiently integrated into traditional decision-support tools. Indeed, MIP solvers require purely declarative models to obtain lower bounds that are critical in reducing the size of the search space.

Although many variants of the DC model exist, few declarative models incorporate reactive flows in cold-start contexts.

In one example, polynomial approximation has the advantage of solving a convex relaxation of the AC power equations but the number of variables and constraints needed to model the relaxation "grows rapidly" and only second-order terms were considered. The accuracy of this approach for general power flows remains an open question as reference focuses on a transmission planning application and does not quantify the accuracy of the approximation relative to an AC power flow.

In another example, semi-definite programming (SDP) relaxation is purely syntactic. It has the great advantage that it can sometimes solve the power flow equations optimally, without any approximation. In fact, it has been demonstrated that the SDP formulation finds the globally optimal value to the AC optimal power flow problem on a number of traditional benchmarks. However, recent work has shown that this does not hold on some practical examples. Computationally, SDP solvers are also less mature than QP solvers and their scalability remains an open question. Solvers integrating discrete variables on top of SDP models are very recent and do not have the scientific maturity of convex MINLP solvers.

At least in one example, the LPAC model is slightly faster than QPAC as it only uses (mixed-integer) linear optimization technology, rather than (mixed-integer) convex nonlinear optimization technology. Nevertheless, the QPAC model provides greater accuracy, keeping in mind that even small improvements in accuracy can save millions of dollars annually in some applications.

Processing Unit 110

Figure 9:
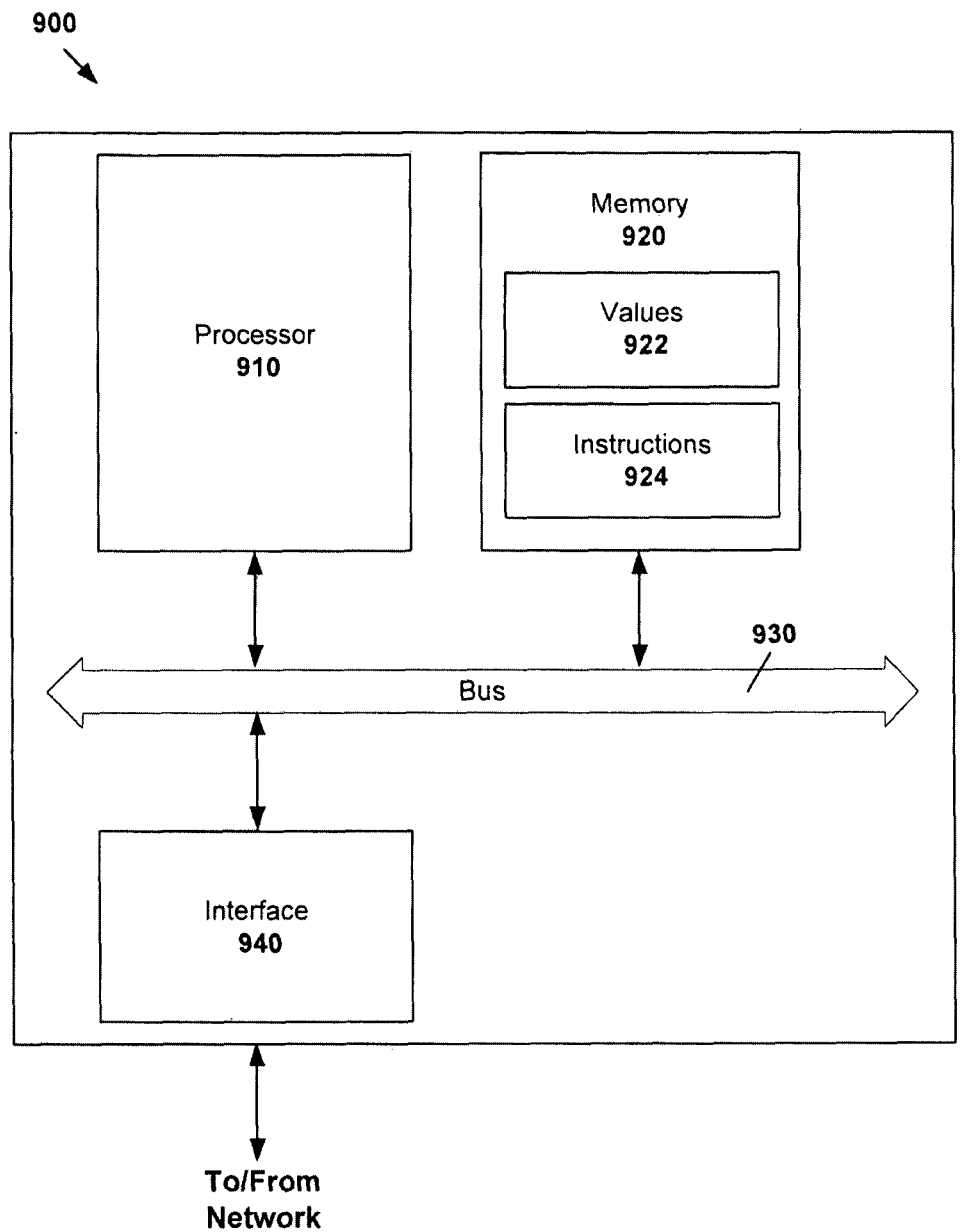
FIG. 9 is a schematic diagram of an example structure of a processing device capable of AC power flow analysis.

The example method in FIG. 2 and FIG. 3 can be implemented by hardware, software or firmware or a combination thereof. Referring to FIG. 9, an example structure of a processing device 900 capable of acting as a processing unit 110 is shown in FIG. 1.

The example device 900 includes a processor 910, a memory 920 and a network interface device 940 that communicate with each other via a communication bus 930. Information may be transmitted and received via the network interface device 940, which may include one or more logical or physical ports that connect the device 900 to another network device.

For example, the various methods, processes and functional units described herein may be implemented by the processor 910. The term 'processor' is to be interpreted broadly to include a CPU, processing unit, ASIC, logic unit, or programmable gate array etc. The processes, methods and functional units may all be performed by a single processor 910 or split between several processors (not shown in FIG. 9 for simplicity); reference in this disclosure or the claims to a 'processor' should thus be interpreted to mean 'one or more processors'.

Although one network interface device 940 is shown in FIG. 9, processes performed by the network interface device 940 may be split between several network interface devices. As such, reference in this disclosure to a 'network interface device' should be interpreted to mean 'one or more network interface devices'.

The processes, methods and functional units may be implemented as machine-readable instructions executable by one or more processors, hardware logic circuitry of the one or more processors or a combination thereof. In the example in FIG. 9, the machine-readable instructions 924 are stored in the memory 920. Other information 922 such as input information, constraints and/or variables computed by the processing unit 110 may be stored in the memory 920, or remote data stores (not shown in FIG. 1).

Further, the processes, methods and functional units described in this disclosure may be implemented in the form of a computer program product. The computer program product is stored in a computer-readable storage medium and comprises a plurality of computer-readable instructions for making a device 700 implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

It should also be understood that, unless specifically stated otherwise as apparent from the following discussion, it is appreciated that throughout the description, discussions utilizing terms such as "optimising", "classifying", "constructing", "receiving", "processing", "retrieving", "selecting", "calculating", "determining", "optimising", "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices. Unless the context clearly requires otherwise, words using singular or plural number also include the plural or singular number respectively.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for alternating current (AC) power flow management in an electrical power network, the method comprising:
   (a) based on information relating to loads, buses connecting the loads, and transmission lines connecting the buses in the electrical power network, determining a convex approximation of AC power flows in the electrical power network, comprising convex approximation of nonlinear cosine terms associated with active power components and reactive power components of the AC power flows the cosine terms having arguments based on a phase angle difference;
   (b) using the convex approximation of the nonlinear cosine terms with arguments based on the phase angle difference to optimize a convex objective function with load variables associated with the loads of the electrical power network, the convex objective function comprising a linear constraint including an inequality that represents a relaxation of quadratic approximation of the nonlinear cosine terms, the linear constraint applied to a non-negative artificial variable $\hat{t}_{nm} \in (0, \infty)$ of active loses and reactive loses to be greater than or equal to a square of the phase angle difference; and
   (c) shedding one or more of the loads based on the load values of the optimized convex objective function.

2. The method of claim 1, wherein:
convex approximation in (a) comprises linear programming approximation of the AC power flows, wherein linear approximation of cosine terms associated with the active power components and reactive power components are determined; and
optimisation in (b) is based on a set of nonlinear constraints that comprises the linear approximation of cosine terms.

3. The method of claim 2, wherein a piecewise linear approximation of the cosine terms is used, and the set of nonlinear constraints includes a set of linear inequalities obtained from the piecewise linear approximation.

4. The method of claim 2, wherein the set of nonlinear constraints associated with the reactive power components is determined by:
expressing voltage magnitudes as variations from fixed magnitudes, and
separating the nonlinear cosine terms into the sum of a first part involving only the fixed magnitudes and linearized in (b) and of a second part involving the variations which is linearized using Taylor expansion of the nonlinear cosine terms using the variations.

5. The method of claim 1, wherein:
convex approximation in (a) comprises convex quadratic programming approximation of the AC power flows, wherein second-order series approximation of cosine terms associated with the active power components and reactive power components are determined; and
optimisation in (b) is based on a set of nonlinear constraints that includes the second-order series approximation of cosine terms.

6. The method of claim 5, wherein the series approximation is second-order Taylor series approximation of the cosine terms.

7. The method of claim 6, wherein the active power components and reactive power components are defined using convex approximation of power loss terms relating to power loss on the transmission lines connecting the buses in the electrical power network.

8. The method of claim 5, wherein the active power components and reactive power components further include a linear outer-approximation of voltage square terms in the components.

9. The method of claim 5, wherein the set of nonlinear constraints further comprises variables to relax the square of the voltage magnitude and phase angle difference terms associated with the active power components and reactive power components, and to define a convex feasible region.

10. The method of claim 1, wherein in an AC power flow application,
   (i) the objective function in (b) is associated with the convex approximation of the cosine terms associated with the active power components and reactive power components; and
   (ii) optimising the objective function maximizes the convex approximation of the cosine terms.

11. The method of claim 1, wherein in a power restoration application,
   (i) the objective function is associated with a served load of the electrical power network; and
   (ii) optimising the objective function maximises the served load to further determine one or more of: generation of active power at each bus, generation of reactive power at each bus and a maximised served load.

12. The method of claim 11, wherein optimisation of the objective function in (ii) is based on nonlinear constraints associated with active power generation, and desired active load and desired reactive load at each bus.

13. The method of claim 1, wherein in a capacitor placement application,
   (i) the objective function is associated with a number of capacitors for placement in the electrical power network; and
   (ii) optimising the objective function optimises the number of capacitors placed in the electrical power network.

14. The method of claim 13, wherein optimisation of the objective function in (ii) is based on nonlinear constraints associated with one or more of: desired voltage limit, capacitor injection variables, and reactive generation limits of generators.

15. The method of claim 1, wherein in an AC optimal power flow application,
   (i) the objective function is associated with a cost of generating electricity in the electrical power network; and (ii) optimising the objective function minimises the cost of generating electricity in the electrical power network.

16. The method of claim 1, wherein convex approximation of the AC power flows further comprises convex approximation of sine terms associated with active power components and reactive power components of the AC power flows.

17. The method of claim 1, wherein optimisation in (b) is based on nonlinear constraints relating to the reactive power components, the nonlinear constraints being determined by:
setting conductance (g) values set to zero; or
setting cosine terms set to unity, and using non-zero conductance (g) values.

18. The method of claim 1, wherein optimisation in (b) is based on constraints relating to one or more of:
Kirchoff's power laws on the buses,
slack bus in the electrical power network;
properties of generator buses and loads in the electrical power network;
properties of transformers, line charging, capacitors, and condensors;
lower and upper bounds on voltage magnitudes and phase angles;
lower and upper bounds on active and reactive power; and
upper bounds on line apparent power.

19. The method of claim 1, wherein optimisation in (b) is based on one of the following:
hot start model, wherein the information in (a) includes a known voltage magnitude at each bus;
warm start model, wherein the information in (a) includes a desired target voltage magnitude at each bus; and
cold start model, wherein the information in (a) includes known voltage magnitude at each voltage-controlled generator bus only.

20. The method of claim 1, wherein the convex approximation is used in an optimisation algorithm for one or more of:
transmission planning, unit commitment, economic dispatch, demand response, transmission switching, vulnerability analysis, and placement of renewable resources or electrical power components in the electrical power network.

21. A non-transitory computer readable medium comprising computer-executable instructions stored thereon that when executed cause a computer to perform the method for alternating current (AC) power flow management in an electrical power network according to claim 1.

22. A computer system for alternating current (AC) power flow management in an electrical power network, the system comprising a processing device to perform the method according to claim 1.

23. An electrical power network in which alternating current (AC) power flow management is performed using the method according to claim 1.

* * * * *